(12) United States Patent
Jung et al.

(10) Patent No.: US 12,250,334 B2
(45) Date of Patent: Mar. 11, 2025

(54) ELECTRONIC DEVICE WITH WATERPROOF STRUCTURE

(71) Applicant: SAMSUNG ELECTRONICS CO., LTD., Suwon-si (KR)

(72) Inventors: Kiyoung Jung, Suwon-si (KR); Woosung Chun, Suwon-si (KR); Jungchul An, Suwon-si (KR); Seungki Choi, Suwon-si (KR); Hyunju Hong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 393 days.

(21) Appl. No.: 17/885,286

(22) Filed: Aug. 10, 2022

(65) Prior Publication Data

US 2023/0046954 A1  Feb. 16, 2023

Related U.S. Application Data

(63) Continuation of application No. PCT/KR2022/011560, filed on Aug. 4, 2022.

(30) Foreign Application Priority Data

Aug. 10, 2021 (KR) .................. 10-2021-0105368
Aug. 11, 2021 (KR) .................. 10-2021-0106361

(51) Int. Cl.
*H04M 1/05* (2006.01)
*G06F 1/16* (2006.01)
(Continued)

(52) U.S. Cl.
CPC ............ *H04M 1/18* (2013.01); *G06F 1/1652* (2013.01); *G06F 1/1656* (2013.01);
(Continued)

(58) Field of Classification Search
CPC .... H04M 1/18; H04M 1/0216; H04M 1/0268; G06F 1/1652; G06F 1/1656; G06F 1/1681
See application file for complete search history.

(56) References Cited

U.S. PATENT DOCUMENTS 8,687,360 B2  4/2014  Nakada
9,348,450 B1  5/2016  Kim
(Continued)

FOREIGN PATENT DOCUMENTS

CN      114698283     7/2022
KR   10-2011-0041390  4/2011
(Continued)

OTHER PUBLICATIONS

IP.com (Year: 2024).*

(Continued)

*Primary Examiner* — Moustapha Diaby
(74) *Attorney, Agent, or Firm* — Nixon & Vanderhye, P.C.

(57) ABSTRACT

An electronic device according to various embodiments of the disclosure may include: a first housing, a second housing, a hinge assembly comprising a hinge disposed between the first housing and the second housing, and including a hinge plate and a hinge module disposed at both ends of the hinge plate in a longitudinal direction of the hinge plate, a first circuit board disposed in the first housing, a second circuit board disposed in the second housing, a flexible display disposed on the first housing, the second housing, and the hinge assembly, a first waterproof member comprising a waterproof material disposed between the first housing and the flexible display, a first adhesive member comprising an adhesive disposed between the hinge module and the flexible display, an electrical component disposed between the first waterproof member and the first adhesive member, (Continued)

an electrical component waterproof member comprising a waterproof material disposed between the electrical component and the flexible display, and a first support disposed between the electrical component waterproof member and the flexible display. An electrical component groove may be formed in the first housing, the electrical component may be disposed in an area of the first circuit board corresponding to the electrical component groove, and covered by the electrical component waterproof member, and a first electrical component hole coupled to the electrical component groove may be formed in a part of the first housing.

20 Claims, 13 Drawing Sheets

(51) Int. Cl.
*H04M 1/02* (2006.01)
*H04M 1/18* (2006.01)

(52) U.S. Cl.
CPC ........ *G06F 1/1681* (2013.01); *H04M 1/0216* (2013.01); *H04M 1/0268* (2013.01)

(56) References Cited

U.S. PATENT DOCUMENTS

| | | | | |
|---|---|---|---|---|
| 2012/0044155 | A1* | 2/2012 | Nakada | G06F 1/1675 345/173 |
| 2014/0162557 | A1 | 6/2014 | Clayson | |
| 2015/0253819 | A1 | 9/2015 | Choi et al. | |
| 2018/0255162 | A1* | 9/2018 | Nam | G06F 1/1652 |
| 2020/0137911 | A1* | 4/2020 | Kim | H05K 5/0247 |
| 2020/0162596 | A1* | 5/2020 | Kim | H05K 1/0393 |
| 2021/0132664 | A1* | 5/2021 | Park | G06F 1/1641 |

FOREIGN PATENT DOCUMENTS

| | | |
|---|---|---|
| KR | 10-2013-0108031 | 10/2013 |
| KR | 10-2015-0105143 | 9/2015 |
| KR | 10-1663517 | 10/2016 |
| KR | 10-2017-0028018 | 3/2017 |
| KR | 10-2017-0098122 | 8/2017 |
| KR | 10-1988965 | 6/2019 |
| KR | 10-2020-0046628 | 5/2020 |
| KR | 10-2020-0057236 | 5/2020 |
| KR | 10-2020-0137948 | 12/2020 |
| KR | 10-2021-0012930 | 2/2021 |
| KR | 10-2023-0023287 | 2/2023 |

OTHER PUBLICATIONS

ProQuest (Year: 2024).*
Search Report and Written Opinion dated Nov. 25, 2022 issued in International Patent Application No. PCT/KR2022/011560.
Extended European Search Report dated Oct. 8, 2024 issued in European Patent Application No. 22856106.4.

* cited by examiner

ELECTRONIC DEVICE WITH WATERPROOF STRUCTURE

CROSS-REFERENCE TO RELATED APPLICATIONS

This application is a continuation of International Application No. PCT/KR2022/011560 designating the United States, filed on Aug. 4, 2022, in the Korean Intellectual Property Receiving Office and claiming priority to Korean Patent Application No. 10-2021-0105368, filed on Aug. 10, 2021, in the Korean Intellectual Property Office, and to Korean Patent Application No. 10-2021-0106361, filed on Aug. 11, 2021, in the Korean Intellectual Property Office, the disclosures of all of which are incorporated by reference herein in their entireties.

BACKGROUND

Field

The disclosure relates to an electronic device including a foldable display.

Description of Related Art

Owing to the remarkable development of information and communication technology and semiconductor technology, various electronic devices have been proliferated rapidly and used increasingly. Particularly, recent electronic devices have been developed such that users communicate while carrying them.

An electronic device refers to a device that executes a specific function according to an installed program, such as an electronic notebook, a portable multimedia player, a mobile communication terminal, a tablet PC, a video/audio player, a desktop/laptop computer, and a vehicle navigation device as well as a home appliance. For example, these electronic devices may output stored information visually or audibly. As the integration level of electronic devices increases and high-speed and large-capacity wireless communication becomes common, a single electronic device such as a mobile communication terminal may be equipped with various functions. For example, a communication function, an entertainment function such as games, a multimedia function such as music/video playback, communication and security functions for mobile banking, schedule management, and an electronic wallet are integrated into one electronic device. Such electronic devices are being miniaturized so that users may conveniently carry them.

As mobile communication services have extended to a multimedia service area, the size of the display of an electronic device may increase so that a user fully uses multimedia services as well as voice calls or short messages. Accordingly, a foldable flexible display may be disposed over the entire area of a housing structure separated to be foldable.

Further, high performance of waterproofing and dustproofing is required in the recent years to enhance user convenience for use in various environments.

As the foldable flexible display is disposed over the entire area of the housing structure, a housing has an unfixed structure. The unfixed structure necessarily includes a plurality of components. Because a plurality of components are used in a foldable part, a space may be formed between components, and foreign materials may be introduced into the space. Therefore, there is a need for protecting an internal structure to prevent the introduction of foreign materials into the electronic device. For example, high performance of waterproofing and/or dustproofing is required.

SUMMARY

Embodiments of the disclosure a waterproof member may be disposed inside a housing to provide a waterproofing and/or dustproofing function in an electronic device.

An electronic device according to various example embodiments of the disclosure may include a first housing, a second housing, a hinge assembly including a hinge disposed between the first housing and the second housing, and including a hinge plate and a hinge module disposed at both ends of the hinge plate in a longitudinal direction of the hinge plate, a first circuit board disposed in the first housing, a second circuit board disposed in the second housing, a flexible display disposed on the first housing, the second housing, and the hinge assembly, a first waterproof member comprising a waterproof material disposed between the first housing and the flexible display, a first adhesive member comprising an adhesive disposed between the hinge module and the flexible display, an electrical component disposed between the first waterproof member and the first adhesive member, an electrical component waterproof member comprising a waterproof material disposed between the electrical component and the flexible display, and a first support disposed between the electrical component waterproof member and the flexible display. An electrical component groove may be formed in the first housing, the electrical component may be disposed in an area of the first circuit board corresponding to the electrical component groove, and covered by the electrical component waterproof member, and a first electrical component hole coupled to the electrical component groove may be formed in a part of the first housing.

An electronic device according to various example embodiments of the disclosure may include: a first housing, a second housing, a hinge assembly comprising a hinge disposed between the first housing and the second housing, and including a hinge plate and a hinge module disposed at both ends of the hinge plate in a longitudinal direction of the hinge plate, a first circuit board disposed in the first housing, a second circuit board disposed in the second housing, a flexible display disposed on the first housing, the second housing, and the hinge assembly, a first waterproof member comprising a waterproof material disposed between the first housing and the flexible display, a second waterproof member comprising a waterproof material disposed between the second housing and the flexible display, a first adhesive member and a second adhesive member comprising an adhesive disposed between the hinge module and the flexible display, an electrical component disposed between the first waterproof member and the first adhesive member, an electrical component waterproof member comprising a waterproof material disposed between the electrical component and the flexible display, a first support disposed between the electrical component waterproof member and the flexible display, a vent groove disposed between the second waterproof member and the second adhesive member, a vent groove waterproof member comprising a waterproof material disposed between the vent groove and the flexible display, and a second support disposed between the vent groove waterproof member and the flexible display. An electrical component groove may be formed in the first housing, the electrical component may be disposed in an area of the first circuit board corresponding to the electrical component groove, and covered by the electrical component waterproof member, a first electrical component hole communicating with the electrical component groove may be formed in a part of the first housing, and a vent hole communicating with the vent groove may be formed in a part of the second housing.

According to various example embodiments of the disclosure, a waterproof member may be disposed in at least one area of an electronic device to prevent and/or reduce introduction of foreign materials from the outside. Accordingly, the durability and usability of the electronic device may be improved.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
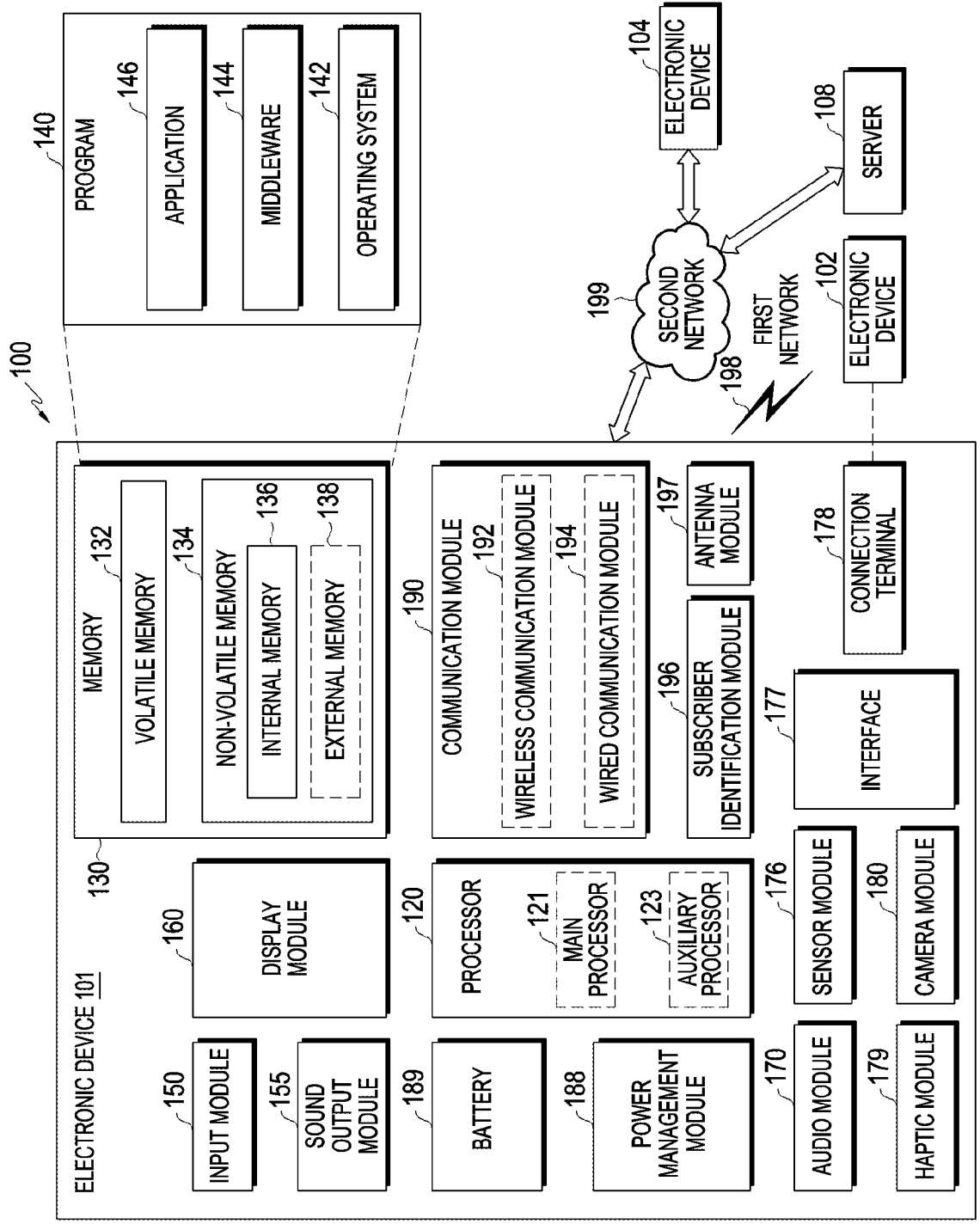
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the 'non-transitory' storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
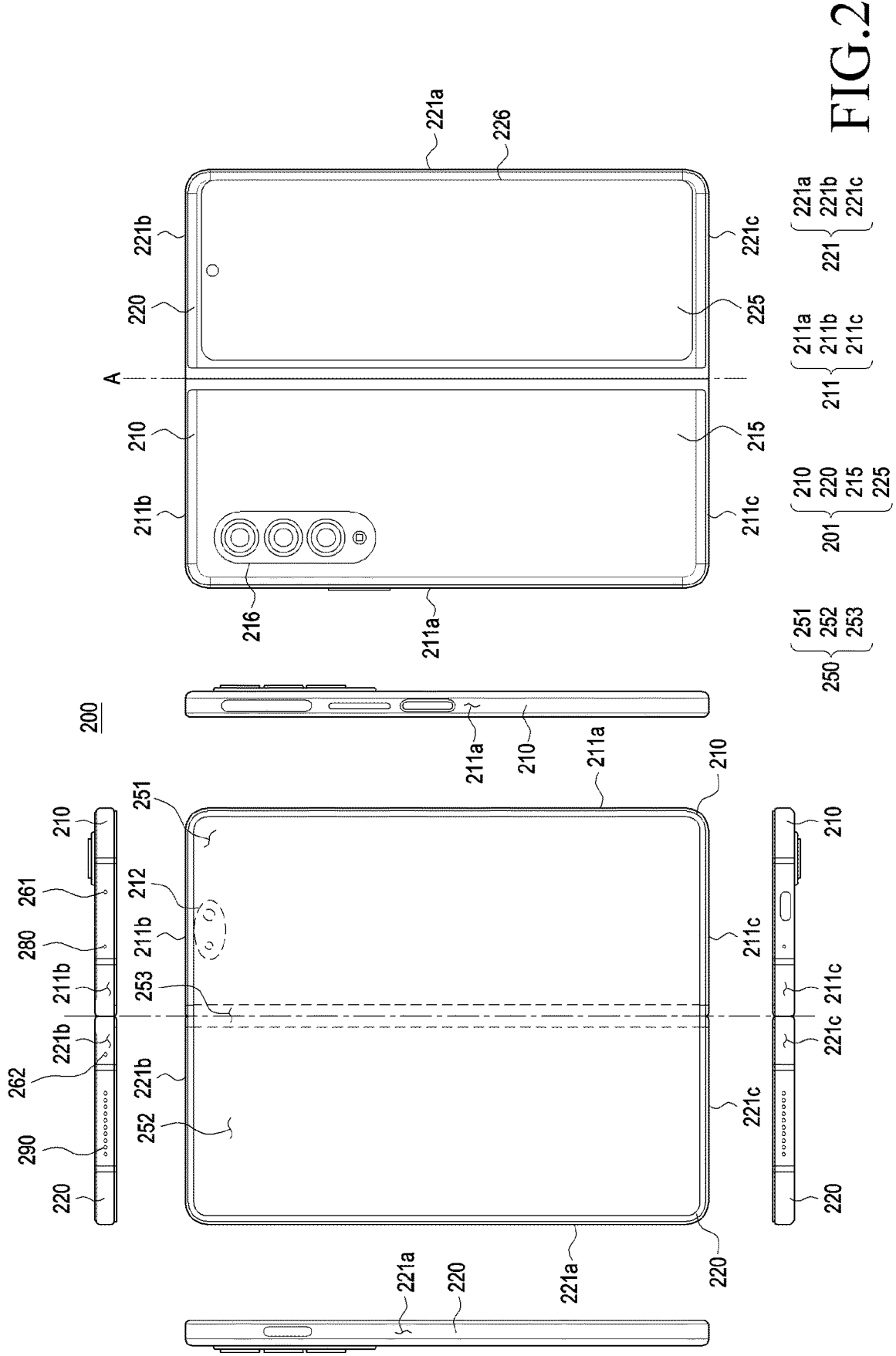
FIG. 2 is a diagram illustrating a foldable electronic device in an unfolded state according to various embodiments.
Figure 3:
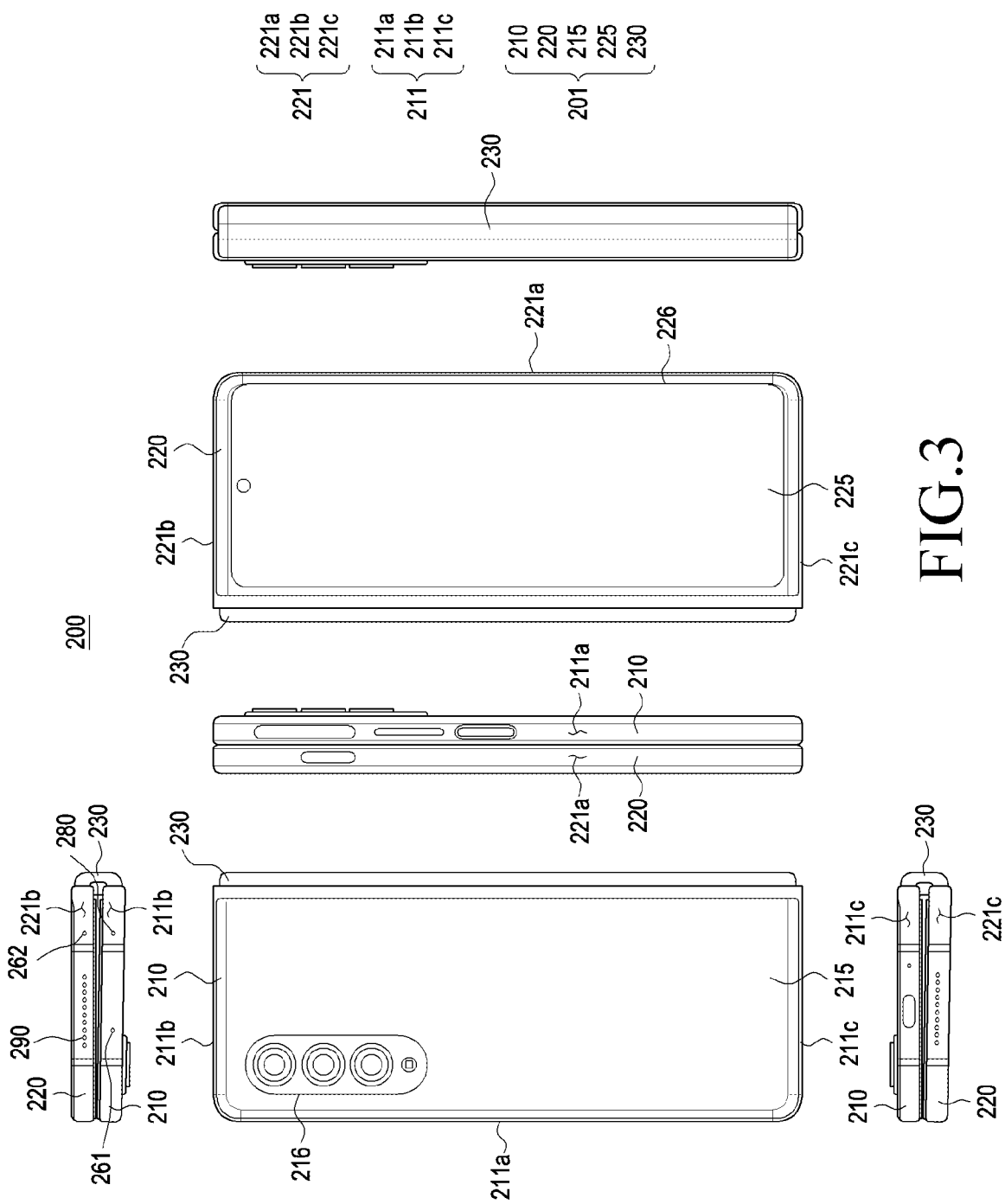
FIG. 3 is a diagram illustrating a foldable electronic device in a folded state according to various embodiments.

FIG. 2 is a diagram illustrating a foldable electronic device in an unfolded state according to various embodiments. FIG. 3 is a diagram illustrating the foldable electronic device in a folded state according to various embodiments.

FIG. 2 is a diagram illustrating an electronic device 200 in an unfolded state according to various embodiments. FIG. 3 is a diagram illustrating the electronic device 200 in a folded state according to various embodiments. The electronic device 200, which is an example of the electronic device 101 illustrated in FIG. 1, may, for example, be a foldable or bendable electronic device.

Referring to FIGS. 2 and 3, in an embodiment, the electronic device 200 may include a foldable housing 201 and a flexible or foldable display 250 (hereinafter, referred to shortly as "flexible display" 250) (e.g., the display device 160 of FIG. 1). According to an embodiment, a surface on which the flexible display 250 is disposed (or a surface on which the flexible display 250 is viewed from the outside of the electronic device 200) may be defined as a front surface of the electronic device 200. In addition, an opposite surface to the front surface may be defined as a rear surface of the electronic device 200. A surface surrounding a space between the front surface and the rear surface may be defined as a side surface of the electronic device 200.

According to various embodiments, the foldable housing 201 may include a first housing 210 including a sensor area 212, a second housing 220, a first rear cover 215, and a second rear cover 225, and a hinge assembly 230. The hinge assembly 230 may include a hinge cover (e.g., a hinge cover 232 of FIG. 5) that covers a foldable part of the foldable housing 201. The foldable housing 201 of the electronic device 200 may be implemented in a different shape or a different combination and/or engagement, not limited to the shape and combination illustrated in FIGS. 2 and 3. For example, in an embodiment, the first housing 210 and the first rear cover 215 may be integrally formed, and the second housing 220 and the second rear cover 225 may be integrally formed.

According to various embodiments, an illuminance sensor (e.g., an illuminance sensor 720 of FIG. 7) and an image sensor (not shown) may be disposed in the sensor area 212. The illuminance sensor 720 may detect the amount of light around the electronic device 200, and the image sensor may convert light incident through a camera lens into a digital signal. The illuminance sensor 720 and the image sensor may be visually exposed from the flexible display 250. According to an embodiment, the illuminance sensor and the image sensor may not be visually exposed. For example, a camera may be configured as an under display camera (UDC). Pixels in an area of the flexible display 250 corresponding to the position of the UDC may be configured differently from pixels in other areas, so that the image sensor and/or the camera may not be visually exposed.

According to various embodiments, the first housing 210 may be coupled to the hinge assembly 230 and include a first front surface facing in a first direction and a first rear surface facing in a direction opposite to the first direction. The second housing 220 may be coupled to the hinge assembly 230 and include a second front surface facing in a second direction and a second rear surface facing in a direction opposite to the second direction. The second housing 220 may rotate around the hinge assembly 230 with respect to the first housing 210. The electronic device 200 may change to the folded stated or the unfolded state.

According to various embodiments, the first housing 210 may include a first side surface 211a disposed between the first front surface and the first rear surface, in parallel to a folding axis A of the hinge assembly 230 apart from the folding axis A, and the second housing 220 may include a second side surface 221a disposed between the second front surface and the second rear surface, in parallel to the folding axis A of the hinge assembly 230 apart from the folding axis A. Further, the first housing 210 may include a third side surface 211b which is perpendicular to the first side surface 211a and has one end coupled to the first side surface 211a, and the other end coupled to the hinge assembly 230, and a fourth side surface 211c which is perpendicular to the first side surface 211a, has one end coupled to the first side surface 211a and the other end coupled to the hinge assembly 230, and is spaced apart from the third side surface 211b in a direction parallel to the third side surface 211b. The second housing 220 may include a fifth side surface 221b which is perpendicular to the second side surface 221a and has one end coupled to the second side surface 221a and the other end coupled to the hinge assembly 230, and a sixth side surface 221c which is perpendicular to the second side surface 221a, has one end coupled to the second side surface 221a and the other end coupled to the hinge assembly 230, and is spaced apart from the fifth side surface 221b in a direction parallel to the fifth side surface 221b. When the second housing 220 is folded against the first housing 210 with respect to the hinge assembly 230, the first side 211a may come closer to the second side 221a, whereas when the second housing 220) is unfolded from the first housing 210 with respect to the hinge assembly 230, the first side surface 211a and the second side surface 221a may move away from each other.

According to an embodiment, in the electronic device 200, the first front surface and the second front surface may face each other in a fully folded state, and the second direction may be the same as the first direction in a fully unfolded state. In the fully unfolded state, the first side surface 211a and the second side surface 221a may be remotest from each other.

According to various embodiments, the first housing 210 and the second housing 220 may be disposed on both sides of the folding axis A and have overall symmetrical shapes with respect to the folding axis A. As described later, the angle or distance between the first housing 210 and the second housing 220 may vary depending on whether the first housing 210 and the second housing 220 are in the unfolded state, the folded state, or an intermediate state in which the electronic device 200 is partially unfolded (or partially folded).

According to various embodiments, as illustrated in FIG. 2, the first housing 210 and the second housing 220 may together form a recess for accommodating the flexible display 250. According to various embodiments, at least parts of the first housing 210 and the second housing 220 may be formed of a metal material or a non-metal material having a rigidity selected to support the flexible display 250. The at least parts of the metal material may provide a ground plane for the electronic device 200, and may be electrically coupled to a ground line formed on a printed circuit board (PCB) disposed inside the foldable housing 201.

According to various embodiments, a protection member (not shown) may be disposed around the periphery of the flexible display 250. The protection member may be formed integrally with the side surface of the foldable housing 201 or as a separate structure. The flexible display 250 may not be adhered to the side surface of the foldable housing 201 and/or the protection member. A gap may be formed between the flexible display 250 and the protection member. The protection member may be configured to cover internal components of the electronic device 200 from the outside or protect the internal components of the electronic device 200 from external impacts. According to an embodiment, the protection member may be configured to cover a wiring mounted on the flexible display 250 from the outside or to protect the wiring from external impacts.

According to various embodiments, the first rear cover 215 may be disposed on one side of the folding axis A on the rear surface of the electronic device 200, have, for example, a substantially rectangular periphery, and be surrounded around the periphery thereof by the first housing 210. Similarly, the second rear cover 225 may be disposed on the other side of the folding axis A on the rear surface of the electronic device 200 and surrounded around the periphery thereof by the second housing 220.

According to various embodiments, the first rear cover 215 and the second rear cover 225 may have substantially symmetrical shapes with respect to the folding axis A. However, the first rear cover 215 and the second rear cover 225 do not necessarily have mutually symmetrical shapes, and in an embodiment, the electronic device 200 may include the first rear cover 215 and the second rear cover 225 in various shapes. In an embodiment, the first rear cover 215 may be integrally formed with the first housing 210, and the second rear cover 225 may be integrally formed with the second housing 220.

According to various embodiments, the first rear cover 215, the second rear cover 225, the first housing 210, and the second housing 220 may form a space in which various components (e.g., a PCB or a battery) may be arranged. According to an embodiment, one or more components may be disposed or visually exposed on the rear surface of the electronic device 200. For example, one or more components or sensors may be visually exposed through a first rear area 216 of the first rear cover 215. In various embodiments, the sensors may include a proximity sensor and/or a rear camera. In an embodiment, at least a part of a sub-display may be visually exposed through a second rear area 226 of the second rear cover 225.

According to various embodiments, a front camera disposed on the front surface (e.g., a second front surface) of the electronic device 200 or a rear camera exposed through the first rear area 216 of the first rear cover 215 may include one or more lenses, an image sensor, and/or an image signal processor. A flash may include, for example, a light emitting diode (LED) or a xenon lamp. In various embodiments, two or more lenses (an IR camera, a wide angle lens, and a telephoto lens) and image sensors may be disposed on one surface of the electronic device 200.

Referring to FIG. 3, the hinge cover (e.g., the hinge cover 232 of FIG. 5) included in the hinge assembly 230 may be disposed between the first housing 210 and the second housing 220 and configured to cover an internal component (e.g., the hinge assembly 230). According to an embodiment, the hinge assembly 230 may be covered by parts of the first housing 210 and the second housing 220 or exposed to the outside according to a state of the electronic device 200 (the unfolded state, the intermediate state, or the folded state).

According to an embodiment, as illustrated in FIG. 2, when the electronic device 200 is in the unfolded state (e.g., the fully unfolded state), the hinge assembly 230 may be covered by the first housing 210 and the second housing 220 and thus may not be exposed. In another example, as illustrated in FIG. 3, when the electronic device 200 is in the folded state (e.g., the fully folded state), the hinge assembly 230 may be exposed to the outside from between the first housing 210 and the second. In another example, when the first housing 210 and the second housing 220 are in the intermediate status in which they are folded at a certain angle, the hinge assembly 230 may be partially exposed to the outside from between the first housing 210 and the second housing 220. In this case, however, an exposed area may be smaller than in the fully folded state. In an embodiment, the hinge assembly 230 may include a curved surface.

According to various embodiments, the flexible display 250 may be disposed in a space formed by the foldable housing 201. For example, the flexible display 250 may be seated in a recess formed by the foldable housing 201 and seen from the outside through the front surface (e.g., the first front surface and/or the second front surface) of the electronic device 200. According to an embodiment, the flexible display 250 may form most of the front surface (e.g., the first front surface and/or the second front surface) of the electronic device 200. Accordingly, the front surface (e.g., the first front surface and/or the second front surface) of the electronic device 200 may form the flexible display 250 and partial areas of the first housing 210 and the second housing 220 adjacent to the flexible display 250. The rear surface (e.g., the first rear surface and/or the second rear surface) of the electronic device 200 may include the first rear cover 215, a partial area of the first housing 210 adjacent to the first rear cover 215, the second rear cover 225, and a partial areas of the second housing 220 adjacent to the second rear cover 225.

According to various embodiments, the flexible display 250 may refer to a display in which at least a partial area is deformable into a flat surface or a curved surface. According to an embodiment, the flexible display 250 may include a folding area 253, a first area 251 disposed on one side of the folding area 253 (e.g., the right side of the folding area 253 illustrated in FIG. 2), a second area 252 disposed on the other side of the folding area 253 (e.g., the left side of the folding area 253 illustrated in FIG. 2).

However, the area division of the flexible display 250 illustrated in FIG. 2 is merely an example, and the display 250 may be divided into a plurality of areas (e.g., two areas or four or more areas) according to its structure or function. For example, in the embodiment illustrated in FIG. 2, the flexible display 250 may be divided into areas by the folding area 253 extending in parallel to the folding axis A. However, in an embodiment, the flexible display 250 may be divided into areas with respect to a different folding axis (e.g., a folding axis parallel to a width direction of the electronic device).

According to various embodiments of the disclosure, the flexible display 250 may be combined with or disposed adjacent to a touch panel including a touch sensing circuit and a pressure sensor for measuring the intensity (pressure) of a touch. For example, the flexible display 250 as an example of a touch panel may be combined with or disposed adjacent to a touch panel that detects an electromagnetic resonance (EMR)-type stylus pen.

According to various embodiments, the first area 251 and the second area 252 may have overall symmetrical shapes with respect to the folding area 253.

A description will be provided below of operations of the first housing 210 and the second housing 220 and each area of the flexible display 250 according to the state of the electronic device 200 (e.g., the folded state, the unfolded state, or the intermediate state)

According to various embodiments, when the electronic device 200 is in the unfolded state (e.g., FIG. 2), the first housing 210 and the second housing 220 may be disposed to face in the same direction, forming an angle of 180 degrees. The surface of the first area 251 and the surface of the second area 252 in the flexible display 250 may form 180 degrees and face in the same direction (e.g., a front direction of the electronic device). In this case, the folding area 253 may form the same plane as the first area 251 and the second area 252.

According to various embodiments, when the electronic device 200 is in the folded state (e.g., FIG. 3), the first housing 210 and the second housing 220 may be disposed to face each other. The surface of the first area 251 and the surface of the second area 252 in the flexible display 250 may face each other, forming a narrow angle (e.g., between 0 degrees and 10 degrees). At least a part of the folding area 253 may be formed of a curved surface having a predetermined curvature.

According to various embodiments, when the electronic device 200 is in the intermediate status, the first housing 210 and the second housing 220 may be disposed at a certain angle. The surface of the first area 251 and the surface of the second area 252 in the flexible display 250 may form an angle greater than that in the folded state and smaller than that in the unfolded state. At least a part of the folding area 253 may be formed of a curved surface having a predetermined curvature, and the curvature may be smaller than that in the folded state.

Figure 4:
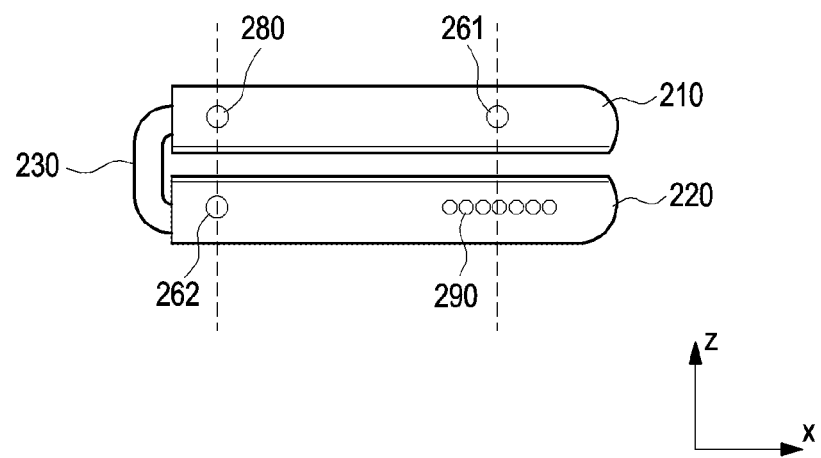
FIG. 4 is a diagram illustrating a top view of a foldable electronic device in a folded state according to various embodiments

FIG. 4 is a diagram illustrating a top view of the foldable electronic device in the folded state according to various embodiments.

The first housing 210, the second housing 220, the hinge assembly 230, a first vent hole 261, a second vent hole 262, a first electrical component hole 280, and second electrical component holes 290 illustrated in FIG. 4 may be identical or similar to the first housing 210, the second housing 220, the hinge assembly 230, the first vent hole 261, and the second vent hole 262, the first electrical component hole 280, and the second electrical component holes 290 illustrated in FIGS. 2 and 3. Accordingly, a description of the same components may be avoided.

Referring to FIG. 4, according to various embodiments, the first vent hole 261 and the first electrical component hole 280 may be formed on a top side surface of the first housing 210. According to an embodiment, the first electrical component hole 280 may be formed closer to the hinge assembly 230 than the first vent hole 261.

According to various embodiments, the second vent hole 262 and the second electrical component holes 290 may be formed on a top side surface of the second housing 220. According to an embodiment, the second vent hole 262 may be formed closer to the hinge assembly 230 than the second electrical component holes 290. According to various embodiments, in the folded state of the second housing 220 with respect to the first housing 210, the first electrical component hole 280 formed in the first housing 210 may disposed on the same line as the second vent hole 262 formed in the second housing 220 in the folded electronic device 200. According to an embodiment, in the folded state of the second housing 220 with respect to the first housing 210, an X-axis value of the first electrical component hole 280 may be equal to an X-axis value of the second vent hole 262.

According to various embodiments, in the folded state of the second housing 220 with respect to the first housing 210, the first vent hole 261 formed in the first housing 210 may be disposed on the same line as any one of the second electrical component holes 290 formed in the second housing 220 in the folded electronic device 200. According to an embodiment, in the folded state of the second housing 220 with respect to the first housing 210, an X-axis value of the first vent hole 261 may be equal to an X-axis value of the second electrical component hole 290.

As the first electrical component hole 280 and the second vent hole 262 are arranged on the same line, and the first vent hole 261 and the second electrical component hole 290 are arranged on the same line as described above, the arrangement of each component may give an aesthetic feeling to a user.

According to various embodiments, the first vent hole 261 and the second vent hole 262 may be formed to communicate with a closed space formed by first to fourth waterproof members (e.g., first to fourth waterproof members 611 to 614 of FIG. 5) disposed on the front and rear surfaces of the foldable housing 201, which will be described later. The first vent hole 261 and the second vent hole 262 may be configured to allow gas to pass therethrough and block the introduction of liquid.

According to various embodiments, the positions of the second electrical component holes 290 and the second vent hole 262 may be exchanged, and the positions of the first electrical component hole 280 and the first vent hole 261 may be exchanged. Accordingly, according to an embodiment, the first vent hole 261 may be formed closer to the hinge assembly 230 than the first electrical component hole 280. According to an embodiment, the second electrical component holes 290 may be formed closer to the hinge assembly 230 than the second vent hole 262.

Figure 5:
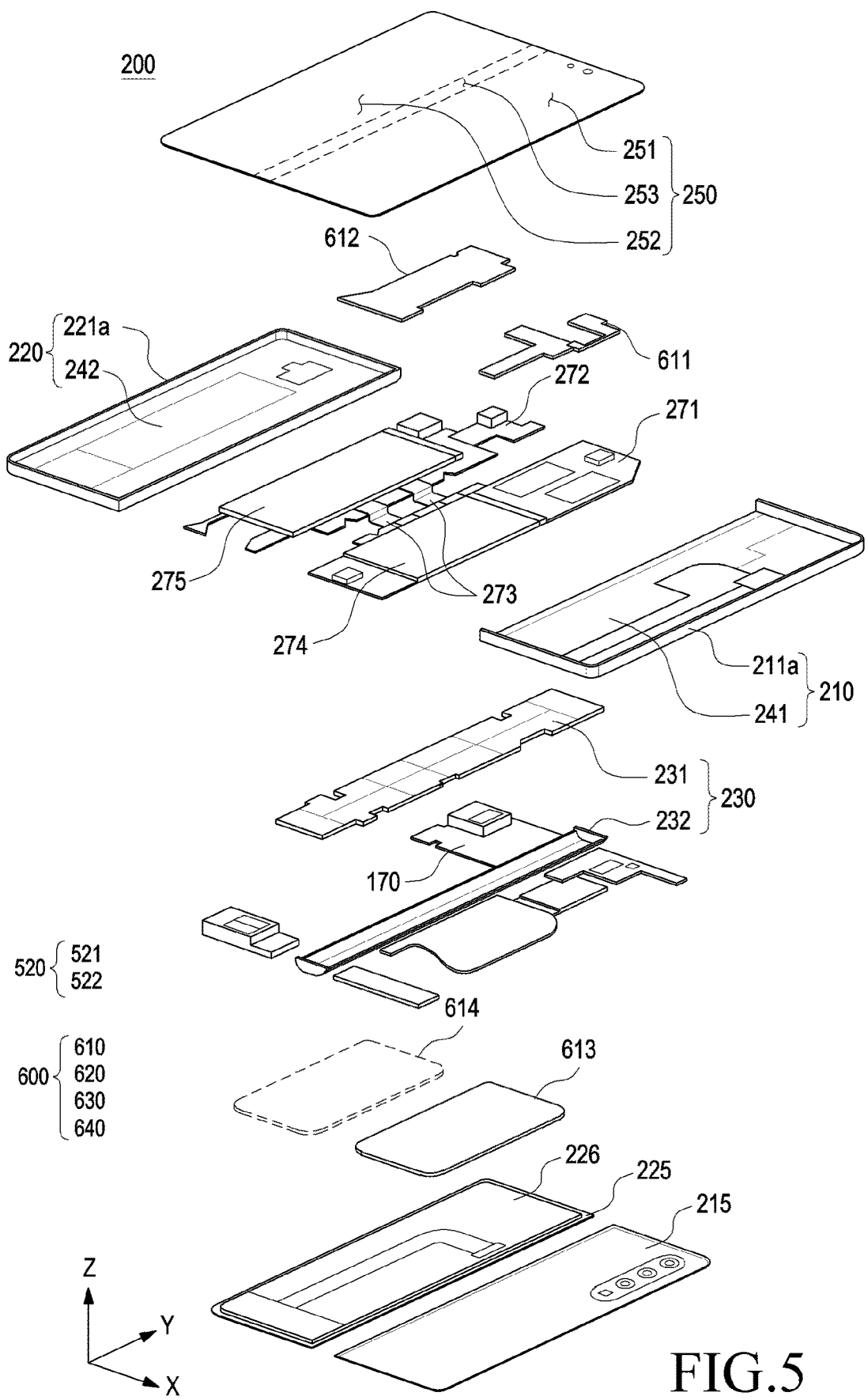
FIG. 5 is an exploded perspective view illustrating a foldable electronic device according to various embodiments.

FIG. 5 is an exploded perspective view illustrating a foldable electronic device according to various embodiments.

In FIG. 5, a spatial coordinate system defined by an X axis, a Y axis, and a Z axis orthogonal to each other is illustrated. The X axis may represent a width direction of the electronic device, the Y axis may represent a longitudinal direction of the electronic device, and the Z axis may represent a height (or thickness) direction of the electronic device. In describing various embodiments of the disclosure, 'first direction and second direction' may refer, for example, to directions parallel to the Z axis.

The foldable housing 201, the first housing 210, the second housing 220, the hinge assembly 230, and the flexible display 250 illustrated in FIG. 5 may be identical or similar to the foldable housing 201, the first housing 210, the second housing 220, the hinge assembly 230, and the flexible display 250 illustrated in FIGS. 2, 3 and 4. Accordingly, a description of the same or similar configuration may not be repeated here.

According to various embodiments of the disclosure, the electronic device 200 may include various electronic components disposed inside or outside the first housing 210 and the second housing 220. The various electronic components include, for example, a processor (e.g., the processor 120 of FIG. 1), memory (e.g., the memory 130 of FIG. 1), an input module (e.g., the input module 150 of FIG. 1), a sound output module (e.g., the sound output module 155 of FIG. 1), the display 250 (e.g., the display module 160 of FIG. 1), an audio module (e.g., the audio module 170 of FIG. 1), a sensor (e.g., the sensor module 176 of FIG. 1), an interface (e.g., the interface 177 of FIG. 1), a connecting terminal (e.g., the connecting terminal 178 of FIG. 1), a haptic module (e.g., the haptic module 179 of FIG. 1), a camera module (e.g., the camera module 180 of FIG. 1), a power management module (e.g., the power management module 188 of FIG. 1), batteries 274 and 275 (e.g., the battery 189 of FIG. 1), a communication module (e.g., the communication module 190 of FIG. 1), a SIM (e.g., the SIM 196 of FIG. 1), or an antenna module (e.g., the antenna module 197 of FIG. 1). The electronic components may be appropriately disposed in the internal or external spaces of the first housing 210 and the second housing 220. In the electronic device 200, at least one (e.g., the connecting terminal 178) of these components may be omitted or one or more other components may be added. Some of these components may be integrated into one component.

According to various embodiments, the electronic device 200, which is a foldable electronic device, may include a plurality of batteries to supply and store power required for driving to electronic components. For example, the batteries may include a first battery 274 and a second battery 275 disposed respectively in the first housing 210 and the second housing 220.

According to various embodiments, the electronic device 200, which is a foldable electronic device, may include a first plate 241 and/or a second plate 242 for disposing components in the first housing 210 and the second housing 220. Various electronic components and/or circuit boards 271 and 272 may be disposed on the first plate 241 and/or the second plate 242. According to an embodiment, the first plate 241 and a first circuit board 271 may be disposed in the first housing 210, and the second plate 242 and a second circuit board 272 may be disposed in the second housing 220. The first plate 241 may include a first surface facing in the first direction, and the second plate 242 may include a second surface facing in the second direction. The first plate 241 and the second plate 242 may be folded to or unfolded from each other by a hinge member 231 formed to correspond to the folding area 253 of the flexible display 250. The first plate 241 and the second plate 242 may be formed such that the first plate 241 and the second plate 242 face each other in the folded state, and the first surface and the second surface face in the same direction in the unfolded state.

According to various embodiments, the first circuit board 271 may be disposed under the first plate 241 (in a −Z-axis direction), and the second circuit board 272 may be disposed under of the second plate 242 (in the −Z-axis direction).

According to various embodiments, signals of the processor for implementing various functions and operations of the electronic device 200 may be transmitted to electronic components through various conductive lines 273 and/or connectors (not shown) formed on the circuit boards 271 and 272.

Referring to FIG. 5, according to various embodiments, the electronic device 200 may include the flexible display 250, the foldable housing 201, the hinge assembly 230, the first circuit board 271, the second circuit board 272, and a member 600.

According to various embodiments, the foldable housing 201 may include the first housing 210, the second housing 220, the first rear cover 215, the second rear cover 225, and the hinge assembly 510.

According to various embodiments, the flexible display 250 may include a display panel (not shown). In an embodiment, the first plate 241 and the second plate 242 may be disposed between the display panel and the first circuit board 271 and between the display panel and the second circuit board 272. The hinge assembly 230 may be disposed between the first plate 241 and the second plate 242.

Figure 6A:
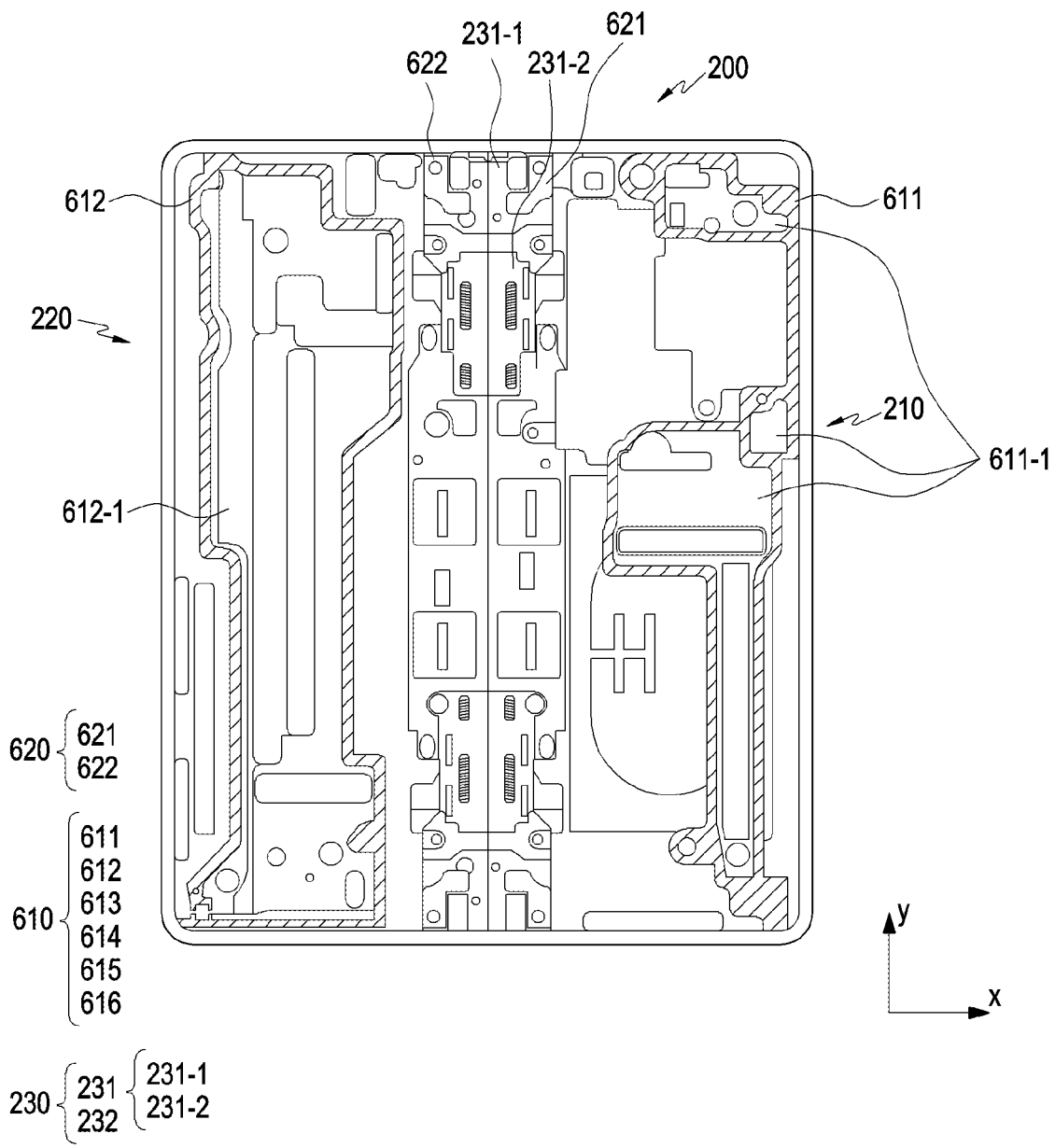
FIG. 6A is a diagram illustrating a front surface of a foldable electronic device with a flexible display removed therefrom, viewed from above according to various embodiments.

According to various embodiments, the hinge assembly 230 may include the hinge member 231 and the hinge cover 232, and the hinge member 231 may include a hinge module 231-1 and a hinge plate 231-2 (refer to FIG. 6A). The hinge cover 232 may cover a structure disposed inside the hinge assembly 230.

According to various embodiments, the first circuit board 271 and the second circuit board 272 may be included. The first circuit board 271 and the second circuit board 272 may be disposed inside a space formed by the first plate 241, the second plate 242, the first housing 210, the second housing 220, the first rear cover 215, and the second rear cover 225. Components for implementing various functions of the electronic device 200 may be arranged on the first circuit board 271 and the second circuit board 272.

According to various embodiments, with the first plate 241 and the second plate 242 coupled with the flexible display 250, the first housing 210 and the second housing 220 may be assembled to each other to be coupled with both sides of the hinge assembly 230. For example, the first housing 210 may be coupled with one side of the hinge assembly 230 by sliding, and the second housing 220 may be coupled with the other side of the hinge assembly 230 by sliding.

According to various embodiments, the member 600 may be disposed inside the electronic device 200. According to an embodiment, the member 600 may be disposed between the first housing 210 and/or the first plate 241 and the flexible display 250. According to an embodiment, the member 600 may be disposed between the second housing 220 and/or the second plate 242 and the flexible display 250.

According to an embodiment, the member 600 may be disposed between the first circuit board 271 and/or the first housing 210 and the first rear cover 215, or between the second circuit board 272 and/or the second housing 220 and the second rear cover 225. According to an embodiment, the member 600 may include a waterproof member (e.g., including a waterproof material) 610, an adhesive member (e.g., an adhesive) 620, a support member (e.g., a support) 630, and a buffer member (e.g., a buffer) 640.

According to various embodiments, the waterproof member 610 may include a first waterproof member 611, a second waterproof member 612, a third waterproof member 613, and a fourth waterproof member 614.

According to various embodiments, the first waterproof member 611 may be disposed between the first plate 241 of the first housing 210 and the first area 251 of the flexible display 250. According to an embodiment, the first waterproof member 611 may be formed of a waterproof tape. The first waterproof member 611 may be adhered to the first housing 210 and/or the first plate 241, and may be adhered to the flexible display 250. The first waterproof member 611 may be configured in a closed curve. The first waterproof member 611 configured in a closed curve may include at least one area. As the first waterproof member 611 is formed of a waterproof tape and includes at least one area configured in a closed curve, the first waterproof member 611 may prevent and/or reduce the introduction of liquid from the outside of the closed curve to the inside of the closed curve of the first waterproof member 611.

According to various embodiments, the second waterproof member 612 may be disposed between the second plate 242 of the second housing 220 and the second area 252 of the flexible display 250. According to an embodiment, the second waterproof member 612 may be formed of a waterproof tape. The second waterproof member 612 may be adhered to the second housing 220 and/or the second plate 242, and may be adhered to the flexible display 250. The second waterproof member 612 may be configured in a closed curve. The second waterproof member 612 configured in a closed curve may include at least one area. As the second waterproof member 612 is formed of a waterproof tape and includes at least one area configured in a closed curve, the second waterproof member 612 may prevent and/or reduce the introduction of liquid from the outside of the closed curve to the inside of the closed curve of the second waterproof member 612.

According to various embodiments, the first waterproof member 611 and the second waterproof member 612 may be disposed not to contact the hinge assembly 230.

According to various embodiments, the third waterproof member 613 may be disposed between the first housing 210 and the first rear cover 215. According to an embodiment, the third waterproof member 613 may be formed of a waterproof tape. The third waterproof member 613 may be adhered to the first housing 210, and may be adhered to the first rear cover 215. The third waterproof member 613 may be configured in a closed curve. The third waterproof member 613 configured in a closed curve may include at least one area. As the third waterproof member 613 is formed of a waterproof tape, and includes at least one area configured in a closed curve, the third waterproof member 613 may prevent and/or reduce the introduction of liquid from the outside of the closed curve to the inside of the closed curve of the third waterproof member 613.

According to various embodiments, the fourth waterproof member 614 may be disposed between the second housing 220 and the second rear cover 225. According to an embodiment, the fourth waterproof member 614 may be formed of a bond and/or a waterproof tape. The fourth waterproof member 614 may be adhered to the second housing 220, and may be adhered to at least a part of the second rear cover 225. The fourth waterproof member 614 may be configured in a closed curve. The fourth waterproof member 614 configured in a closed curve may include at least one area. Since the fourth waterproof member 614 is formed of a bond and includes at least one area configured in a closed curve, the fourth waterproof member 614 may prevent and/or reduce the introduction of liquid from the outside of the closed curve to the inside of the closed curve of the fourth waterproof member 614.

As the waterproof member 610 is disposed inside the electronic device 200, the introduction of liquid from the outside of the electronic device 200 to the inside of the electronic device 200 may be prevented and/or reduced.

Figure 6B:
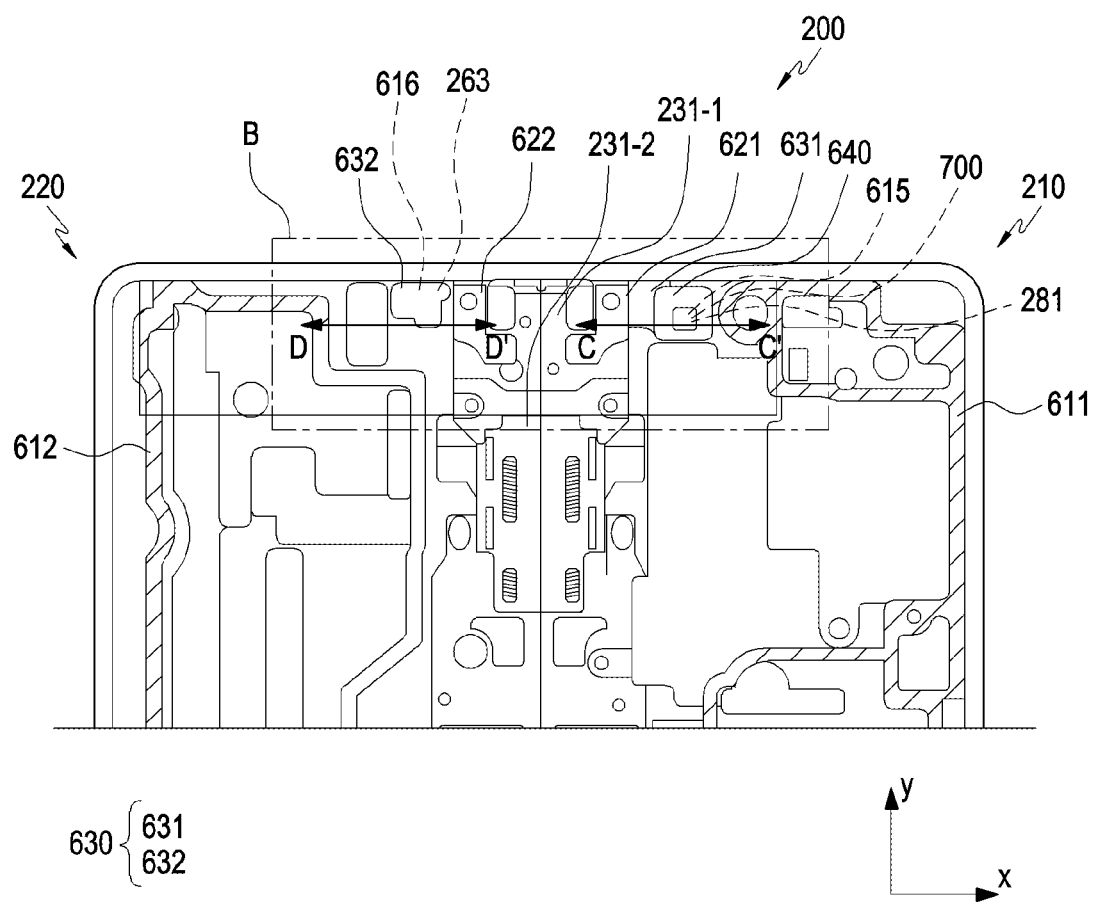
FIG. 6B is a diagram illustrating an area of the foldable electronic device with the flexible display removed therefrom, viewed from above according to various embodiments

FIG. 6A is a diagram illustrating a front surface of a foldable electronic device with a flexible display removed therefrom, viewed from above according to various embodiments. FIG. 6B is a diagram illustrating an area of the front surface of the foldable electronic device with the flexible display removed therefrom, viewed from above according to various embodiments.

The first housing 210, the second housing 220, a hinge assembly (e.g., the hinge assembly 230 of FIG. 4), and the waterproof member 610 illustrated in FIGS. 6A and 6B may be identical or similar to the first housing 210, the second housing 220, the hinge assembly 230, and the waterproof member 610 illustrated in FIGS. 2 to 5. Accordingly, a description of the same components may not be repeated here.

FIG. 6A is a plan view illustrating an example embodiment of a foldable electronic device (e.g., the electronic device 200 of FIG. 2) with a flexible display (e.g., the flexible display 250 of FIG. 2) removed therefrom, and FIG. 6B is an enlarged plan view illustrating an area of the electronic device 200 illustrated in FIG. 6A.

Referring to FIGS. 6A and 6B, the first circuit board 271 may be disposed under (the −Z-axis direction) and/or inside the first housing 210, and the second circuit board 272 may be disposed under (the −Z-axis direction) and/or inside the housing 220. The hinge assembly 230 may be disposed between the first housing 210 and the second housing 220.

According to various embodiments, the first waterproof member 611 may include various waterproof materials and be disposed between the first housing 210 and the flexible display 250, and the second waterproof member 612 may include various waterproof materials and be disposed between the second housing 220 and the flexible display 250. According to an embodiment, the first waterproof member 611 may be disposed between the first plate 241 of the first housing 210 and the flexible display 250, and the second waterproof member 612 may be disposed between the second plate 242 of the second housing 220 and the flexible display 250

The first waterproof member 611 may be disposed to form a closed curve, and at least one first waterproof area 611-1 surrounded by the closed curve formed by the first waterproof member 611 may be formed. The second waterproof member 612 may be disposed to form a closed curve, and at least one second waterproof area 612-1 surrounded by the closed curve formed by the second waterproof member 612 may be formed. The first waterproof member 611 and the second waterproof member 612 may be formed of a waterproof tape comprising a waterproof material. According to an embodiment, the first waterproof member 611 may be adhered to the first housing 210 and/or the flexible display 250, and the second waterproof member 612 may be adhered to the second housing 220 and/or the flexible display 250. As the first waterproof member 611 and the second waterproof member 612 are disposed inside the electronic device 200 as described above, the waterproofing performance of the electronic device 200 may be improved. According to an embodiment, the first waterproof member 611 and the second waterproof member 612 may be disposed to be spaced apart from the hinge assembly 230. As the first waterproof member 611 and the second waterproof member 612 are disposed to be spaced apart from the hinge assembly 230, the first waterproof member 611 and the second waterproof member 612 may be well adhered to the housing 210, the second housing 220, and the flexible display 250, without being significantly affected by the state (the folded or unfolded state) of the electronic device 200. Accordingly, the waterproofing performance of the electronic device 200 may be improved.

According to various embodiments, the hinge assembly 230 may include the hinge member 231 and the hinge cover 232, and the hinge member 231 may include the hinge module 231-1 and the hinge plate 231-2. According to an embodiment, the hinge module 231-1 may be disposed at both ends of the hinge plate 231-2 in a longitudinal direction of the hinge plate 231-2 (a Y-axis direction). The hinge module 231-1 may include a first hinge module (e.g., a first hinge module 231-11 of FIG. 7) and a second hinge module (e.g., a second hinge module 231-12 of FIG. 7). The first hinge module 231-11 may be disposed on the right side of a folding axis (e.g., the folding axis A of FIG. 2) (a +X-axis direction), and the second hinge module 231-12 may be disposed on the left side of the folding axis (e.g., the folding axis A of FIG. 2) (a −X-axis direction). The first hinge module 231-11 and/or the second hinge module 231-12 may be coupled to the first housing 210 and/or the second housing 220. The first hinge module 231-11 and the second hinge module 231-12 may be coupled to each other and rotatable relative to each other. The hinge module 231-1 and the hinge plate 231-2 may include various components and/or boards necessary for the operation of the electronic device 200.

According to various embodiments, an adhesive member (e.g., including an adhesive) 620 may be disposed on at least a part of the hinge module 231-1 and/or the hinge plate 231-2. The adhesive member 620 may include a first adhesive member 621 and a second adhesive member 622. According to an embodiment, the first adhesive member 621 and the second adhesive member 622 may be formed of a pressure sensitive adhesive (PSA) tape.

According to various embodiments, the first adhesive member 621 may be disposed on at least a part of the hinge module 231-1 of the hinge assembly 230. According to an embodiment, the first adhesive member 621 may be disposed on the first hinge module 231-11 of the hinge module 231-1. The first adhesive member 621 may be disposed between the hinge module 231-1 and the flexible display 250. The first adhesive member 621 may be attached to the hinge module 231-1 and the flexible display 250. The first adhesive member 621 may be disposed close to the folding axis (e.g., the folding axis A of FIG. 2). Accordingly, the first adhesive member 621 may be disposed closer to the folding axis A than the first waterproof member 611. As the first adhesive member 621 is disposed close to the folding axis A, the first adhesive member 621 may be well adhered to the hinge module 231-1 and the flexible display 250 without being significantly affected by various states (the folded state or the unfolded state) of the electronic device 200. Accordingly, the flexible display 250 may not be separated from the foldable housing 201.

According to various embodiments, the second adhesive member 622 may be disposed on at least a part of the hinge module 231-1 of the hinge assembly 510. The second adhesive member 622 may be disposed on the second hinge module 231-12 of the hinge module 231-1. The second adhesive member 622 may be disposed between the hinge module 231-1 and the flexible display 250. The second adhesive member 622 may be adhered to the hinge module 231-1 and the flexible display 250. The second adhesive member 622 may be disposed to close to the folding axis (e.g., the folding axis A of FIG. 2). Accordingly, the second adhesive member 622 may be disposed closer to the folding axis A than the first waterproof member 612. As the second adhesive member 622 is disposed close to the folding axis A, the second adhesive member 622 may be well adhered to the hinge module 231-1 and the flexible display 250 without being significantly affected by various states (the folded state or the unfolded state) of the electronic device 200. Accordingly, the flexible display 250 may not be separated from the foldable housing 201.

According to various embodiments, the first waterproof member 611 and the first adhesive member 621 may be formed of different waterproof materials, and the thickness of the first waterproof member 611 may be different from that of the first adhesive member 621. According to an embodiment, a gap between the hinge assembly 230 and the flexible display 250 may be smaller than a gap between the foldable housing 201 and the flexible display 250. Accordingly, the first adhesive member 621 disposed between the hinge assembly 230 and the flexible display 250 may be formed thinner than the first waterproof member 611 disposed between the foldable housing 201 and the flexible display 250. According to an embodiment, the gap between the hinge assembly 230 and the flexible display 250 may be greater than the gap between the foldable housing 201 and the flexible display 250. Accordingly, the first adhesive member 621 may be formed thicker than the first waterproof member 611. According to an embodiment, the top of the hinge assembly 230 (in the +Z-axis direction) may be disposed higher (in the +Z-axis direction) than the top of the first housing 210 and/or the second housing 220 (in the +Z-axis direction). According to an embodiment, the top of the hinge assembly 230 (in the +Z-axis direction) may be disposed lower (in the —Z-axis direction) than the top of the first housing 210 and/or the second housing 220 (in the +Z-axis direction).

Referring to FIG. 6B, according to various embodiments, an electrical component 700 may be disposed in the first housing 210. According to an embodiment, the electrical component 700 may be disposed between the first adhesive member 621 and the first waterproof member 611. According to an embodiment, the electrical component 700 may be disposed on the right side of the first adhesive member 621 (in the +X-axis direction). The electrical component 700 may include various sensors and/or components necessary for the operation of the electronic device 200. The electrical component 700 will be described in greater detail below with reference to the description of FIG. 7.

According to various embodiments, the electrical component 700 may be disposed on the first circuit board 271. An electrical component groove 281 may be formed in the first housing 210. The electrical component groove 281 may be a groove formed with a step difference from its surroundings. The electrical component groove 281 may be configured to communicate with the first electrical component hole 280 formed in the first housing 210. The electrical component 700 may be disposed in an opening (not shown) formed in the first housing 210 under the electrical component groove 281 (in the –Z-axis direction). An electrical component waterproof member 615 and/or a first support member 631 may be disposed in the electrical component groove 281.

According to various embodiments, the electrical component waterproof member 615 may be disposed on the electrical component 700 (in the +Z-axis direction). The electrical component waterproof member 615 may be disposed between the electrical component 700 and the flexible display 250. The electrical component waterproof member 615 may be formed of a waterproof tape. An opening may be formed in an area of the electrical component waterproof member 615.

According to various embodiments, the support member 630 may be disposed on of the waterproof member 615 of the electrical component 700 (in the +Z-axis direction). The support member 630 may include a first support member 631 and a second support member 632.

According to various embodiments, the first support member 631 may be disposed on the electrical component waterproof member 615 (in the +Z-axis direction). The first support member 631 may be disposed between the electrical component waterproof member 615 and the flexible display 250. The first support member 631 may be formed of polycarbonate. According to an embodiment, the first support member 631 may be formed of a glass material. The electrical component waterproof member 615 may be disposed between the first support member 631 and the electrical component 700.

According to various embodiments, the buffer member 640 may be disposed on the first support member 631 (in the +Z-axis direction). According to an embodiment, the buffer member 640 may be disposed between the first support member 631 and the flexible display 250. The buffer member 640 may be formed of polycarbonate. According to an embodiment, the buffer member 640 may be formed of a compressible sponge material.

According to various embodiments, the top of the first support member 631 and/or the buffer member 640 (in the +Z-axis direction) may be configured not to contact the flexible display 250 or not to be adhered to the flexible display 250. As described above, as the electrical component 700, the electrical component waterproof member 615, the first support member 631, and the buffer member 640 are configured to be stacked from the bottom (the —Z-axis direction) to the top (the +Z-axis direction), the waterproof performance of the electrical component 700 may be improved.

According to various embodiments, a vent groove 263 communicating with a second vent hole 262 may be formed in the second housing 220. According to an embodiment, the vent groove 263 may be disposed between the second adhesive member 622 and the second waterproof member 612. According to an embodiment, the vent groove 263 may be disposed on the left side of the second adhesive member 622 (in the –X-axis direction).

According to various embodiments, a vent groove waterproof member 616 may be disposed on the vent groove 263 (in the +Z-axis direction). According to an embodiment, the vent groove waterproof member 616 may be disposed between the vent groove 263 and the flexible display 250. The vent groove waterproof member 616 may be formed of a waterproof tape.

According to various embodiments, the buffer member 640 may be disposed on the vent groove waterproof member 616 (in the +Z-axis direction). According to an embodiment, the buffer member 640 may be disposed between the vent groove waterproof member 616 and the flexible display 250. The buffer member 640 may be formed of polycarbonate.

Figure 7:
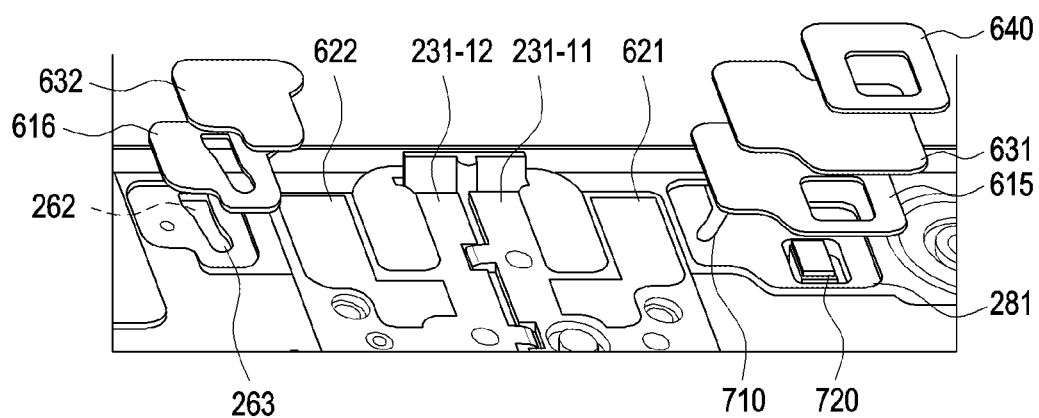
FIG. 7 is a partial perspective view illustrating an area of a foldable electronic device with a flexible display removed therefrom according to various embodiments.

FIG. 7 is a partial perspective view illustrating an area of a foldable electronic device with a flexible display removed therefrom according to various embodiments.

FIG. 7 is a perspective view illustrating an area B of the electronic device 200 illustrated in FIG. 6B. The second vent hole 262, the vent groove 263, the electrical component waterproof member 615, the vent groove waterproof member 616, the first adhesive member 621, the second adhesive member 622, the first support member 631, the second support member 632, the buffer member 640, and the electrical component 700 illustrated in FIG. 7 may be identical or similar to the second vent hole 262, the vent groove 263, the electrical component waterproof member 615, the vent groove waterproof member 616, the first adhesive member 621, the second adhesive member 622, the first support member 631, the second support member 632, the buffer member 640, and the electrical component 700 illustrated in FIGS. 2 to 6B.

Referring to FIG. 7, according to various embodiments, the electrical component 700 may include a microphone 710 and the illuminance sensor 720.

According to various embodiments, the hinge module 231-1 may include the first hinge module 231-11 and the second hinge module 231-12. The first hinge module 231-11 and/or the second hinge module 231-12 may be coupled to the first housing 210 and/or the second housing 220. The first hinge module 231-11 and the second hinge module 231-12 may be coupled to each other and rotatable relative to each other.

According to various embodiments, the first adhesive member 621 may be disposed on the first hinge module 231-11 and/or the hinge plate 231-2, and the second adhesive member 622 may be disposed on the second hinge module 231-12 and/or the hinge plate 231-2.

According to various embodiments, the microphone 710 may communicate with the first electrical component hole 280 (refer to FIG. 1). The first electrical component hole 280 may be configured to communicate with the electrical component groove 281. The microphone 710 may be disposed on the first circuit board 271 disposed under the first housing 210 (in the −Z-axis direction). The electrical component waterproof member 615 and/or the first support member 631 may be disposed in the electrical component groove 281.

According to various embodiments, the illuminance sensor 720 may be disposed in an opening (not shown) formed in the first housing 210 under of the electrical component groove 281 (in the −Z-axis direction).

According to various embodiments, the electrical component waterproof member 615 may be disposed on the microphone 710 and the illuminance sensor 720 (in the +Z-axis direction). According to an embodiment, an opening may be formed in an area of the electrical component waterproof member 615 corresponding to the top of the illuminance sensor 720 (in the +Z-axis direction). As the single electrical component waterproof member 615 is disposed on the microphone 710 and the illuminance sensor 720, the width of the electrical component waterproof member 615 adjacent to the illuminance sensor 720 may be maximized and/or made larger. As the width of the electrical component waterproof member 615 adjacent to the illuminance sensor 720 increases, the waterproofing performance of the electrical component waterproof member 615 may be improved. According to various embodiments, an opening may be formed in an area of the electrical component waterproof member 615 corresponding to the position of the electrical component 700.

According to various embodiments, the microphone 710 may be disposed under an area of the first circuit board 271 (in the −Z-axis direction) corresponding to the position of the electrical component groove 281 formed in the first housing 210, and the electrical component groove 281 may communicate with the first electrical component hole 280. The electrical component waterproof member 615 and/or the first support member 631 may be disposed in the electrical component groove 281. According to an embodiment, the first electrical component hole 280 and/or the electrical component groove 281 may be formed obliquely to the longitudinal direction of the first housing 210 and/or the hinge assembly (e.g., the hinge assembly 230 of FIG. 5).

According to various embodiments, the first support member 631 may be disposed on of the electrical component waterproof member 615 (in the +Z-axis direction). According to an embodiment, the first support member 631 may be formed of a transparent member, and the buffer member 640 may be disposed on the first support member 631 (in the +Z-axis direction). When the electrical component disposed under the first support member 631 (in the −Z-axis direction) is an electrical component that senses light, the first support member 631 may be formed of a transparent member, for light transmission.

According to various embodiments, an opening may be formed in an area of the first housing 210, the first plate 241, and/or various other components, corresponding to the position of the first electrical component groove 281. According to this configuration, when an electrical component for sensing light is disposed under the first support member 631 (in the −Z-axis direction), the electrical component may better detect light.

According to an embodiment, an opening may be formed in an area of the buffer member 640 corresponding to the position of the illuminance sensor 720. As the buffer member 640 is disposed on the first support member 631, a greater pressure may be applied to the first support member 631 and the electrical component waterproof member 615, and foreign materials introduced from the outside may filtered out by the buffer member 640.

According to various embodiments, the second vent hole 262 may be formed in the second housing 220. The second vent hole 262 may allow gas inflow from the outside and prevent and/or reduce the introduction of liquid. The vent groove 263 communicating with the second vent hole 262 may be formed in the second housing 220.

According to various embodiments, the vent groove waterproof member 616 may be disposed on the vent groove 263 (in the +Z-axis direction). According to an embodiment, an opening may be formed in an area of the vent groove waterproof member 616 corresponding to the position of the vent groove 263.

According to various embodiments, the second support member 632 may be disposed on the vent groove waterproof member 616 (in the +Z-axis direction). According to an embodiment, the second support member 632 may be formed of a transparent member. As the second support member 632 is disposed on the vent groove waterproof member 616, a higher pressure may be applied to the vent groove waterproof member 616, thereby improving the waterproofing performance.

According to various embodiments, the vent groove 263 may be formed in the second housing 220. The vent groove 263 may be configured to communicate with the second vent hole 262. According to an embodiment, the second vent hole 262 and/or the vent groove 263 may be formed obliquely to the longitudinal direction of the second circuit board 272 and/or the second housing 220.

Figure 8A:
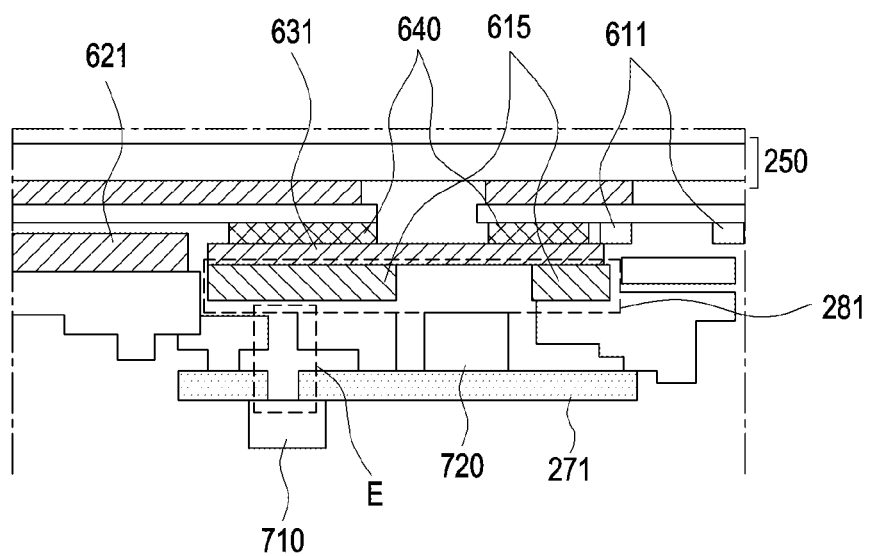
FIG. 8A is a cross-sectional view illustrating the foldable electronic device with the flexible display removed therefrom illustrated in FIG. 6B, taken along line A-A', viewed in a +Y-axis direction according to various embodiments.
Figure 8B:
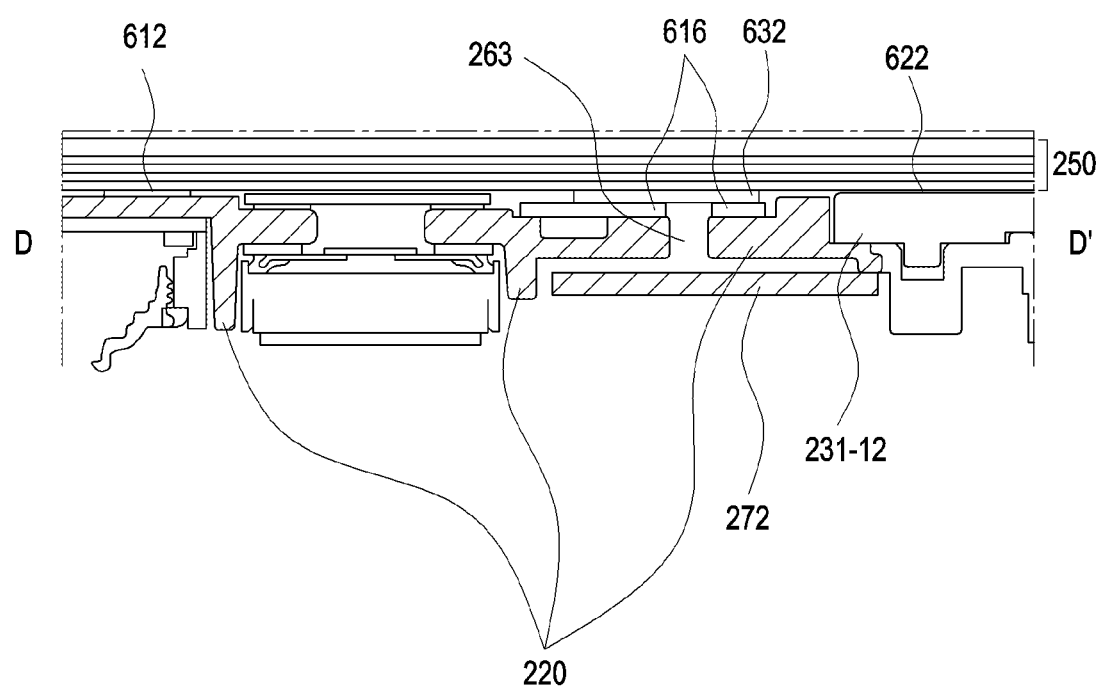
FIG. 8B is a cross-sectional view illustrating the foldable electronic device with the flexible display removed therefrom illustrated in FIG. 6B, taken along line B-B', viewed in the +Y-axis direction according to various embodiments.

FIG. 8A is a cross-sectional view illustrating the foldable electronic device with the flexible display removed therefrom illustrated in FIG. 6B, taken along line C-C', which is viewed in the +Y-axis direction according to various embodiments. FIG. 8B is a cross-sectional view illustrating the foldable electronic device with the flexible display removed therefrom illustrated in FIG. 6B, taken along line D-D, which is viewed in the +Y-axis direction according to various embodiments.

The first housing 210, the flexible display 250, the electrical component groove 281, the first hinge module 231-11, the first circuit board 271, the first waterproof member 611, the electrical component waterproof member 615, the first adhesive member 621, the microphone 710, and the illuminance sensor 720 illustrated in FIG. 8 may be identical or similar to the housing 210, the flexible display 250, the electrical component groove 281, the first hinge module 231-11, the first circuit board 271, the first waterproof member 611, the electrical component waterproof member 615, the first adhesive member 621, the microphone 710, and the illuminance sensor 720 illustrated in FIGS. 2 to 7. Accordingly, a description of the same components may not be repeated here.

According to various embodiments, the microphone 710 may be disposed under the first circuit board 271 (in the −Z-axis direction). According to an embodiment, the microphone 710 may be disposed in an opening (not shown) formed in the first housing 210 under the electrical component groove 281 (in the −Z-axis direction).

According to various embodiments, the illuminance sensor 720 may be disposed on the first circuit board 271 (in the +Z-axis direction).

According to various embodiments, the electrical component waterproof member 615 may be disposed on the microphone 710, the electrical component groove 281, and the illuminance sensor 720 (in the +Z-axis direction). The electrical component waterproof member 615 may be disposed in the electrical component groove 281 in which a step is formed with respect to a surrounding area. As the electrical component waterproof member 615 is disposed, the effect of decreasing the depth of a microphone conduit E may occur. As the depth of the microphone conduit E decreases, the effect of decreasing the length of a conduit in which waves travel to the microphone 710 may occur. Accordingly, the performance of the microphone 710 may be improved. According to an embodiment, the electrical component groove 281 may be formed with no step difference or almost no step difference from the surrounding area. Accordingly, the depth of the microphone conduit E may be further decreased.

According to various embodiments, the first adhesive member 621 may be disposed between the first hinge module 231-11 of the hinge module 231-1 and the flexible display 250. According to an embodiment, the first adhesive member 621 may be attached to the first hinge module 23-11 and the flexible display 250.

According to various embodiments, the electrical component waterproof member 615 may be disposed between the first housing 210 and the flexible display 250. According to an embodiment, the electrical component waterproof member 615 may be adhered to the first housing 210.

According to various embodiments, the first waterproof member 611 may be disposed between the first housing 210 and the flexible display 250. According to an embodiment, the first waterproof member 611 may be adhered to the first housing 210 and the flexible display 250.

According to various embodiments, the first adhesive member 621 and the first waterproof member 611 may be disposed to be spaced apart from each other. As the first adhesive member 621 and the first waterproof member 611 are disposed to be spaced apart from each other, durability against slip caused by relative movements of the first housing 210 and the second housing 220 may be increased, thereby increasing the durability of the electronic device 200.

According to various embodiments, the first waterproof member 611 and the first adhesive member 621 may be formed of different materials, and the thickness of the first waterproof member 611 may be different from that of the first adhesive member 621. According to an embodiment, the gap between the hinge assembly 230 and the flexible display 250 may be smaller than the gap between the foldable housing 201 and the flexible display 250. Accordingly, the first adhesive member 621 disposed between the hinge assembly 230 and the flexible display 250 may be formed thinner than the first waterproof member 611 disposed between the first housing 210 and the flexible display 250. According to an embodiment, the gap between the hinge assembly 230 and the flexible display 250 may be formed greater than the gap between the first housing 210 and the flexible display 250. Accordingly, the first adhesive member 621 may be formed thicker than the first waterproof member 611.

According to various embodiments, as the first adhesive member 621 is adhered to the first hinge module 231-11 and the flexible display 250, the first waterproof member 611 is adhered to the first housing 210 and the flexible display 250, and the electrical component waterproof member 615 disposed between the first adhesive member 621 and the first waterproof member 611 is adhered to the first housing 210, durability against slip caused by relative movements of the first housing 210 and the second housing 220 may be increased, thereby increasing the durability of the electronic device 200.

According to various embodiments, a camera 800 (refer to FIG. 10) may be disposed between parts of the first waterproof member 611.

The second housing 220, the flexible display 250, the vent groove 263, the second hinge module 231-12, the second circuit board 272, the second waterproof member 612, the vent groove waterproof member 616, and the second adhesive member 622 illustrated in FIG. 8B may be identical or similar to the second housing 220, the flexible display 250, the vent groove 263, and the second hinge module 231-12, the second circuit board 272, the second waterproof member 612, the vent groove waterproof member 616, and the second adhesive member 622 illustrated in FIGS. 2 to 7. Accordingly, a description of the same components may be avoided.

According to various embodiments, the vent groove 263 may be formed on the second housing 220 (in the +Z-axis direction).

According to various embodiments, the vent groove 263 may be formed to communicate with a second vent hole (e.g., the second vent hole 262 of FIG. 4) formed in the second housing (e.g., the second housing 220 of FIG. 4).

According to various embodiments, the vent groove waterproof member 616 may be disposed on the vent groove 263 (in the +Z-axis direction).

According to various embodiments, the second adhesive member 622 may be disposed between the second hinge module 231-12 of the hinge module 231-1 and the flexible display 250. According to an embodiment, the second adhesive member 622 may be adhered to the second hinge module 231-12 and the flexible display 250.

According to various embodiments, the vent groove waterproof member 616 may be disposed between the second housing 220 and the flexible display 250. According to an embodiment, the vent groove waterproof member 616 may be adhered to the second housing 220.

According to various embodiments, the second waterproof member 612 may be disposed between the second housing 220 and the flexible display 250. According to an embodiment, the second waterproof member 612 may be adhered to the second housing 220 and the flexible display 250.

According to various embodiments, the second adhesive member 622 and the second waterproof member 612 may be disposed to be spaced apart from each other. As the second adhesive member 622 and the second waterproof member 612 are disposed to be spaced apart from each other, durability against slip caused by relative movements of the first housing 210 and the second housing 220 may be increased, thereby increasing the durability of the electronic device 200.

According to various embodiments, as the second adhesive member 622 is adhered to the second hinge module 231-12 and the flexible display 250, the second waterproof member 612 is adhered to the second housing 220 and the flexible display 250, and the vent groove waterproof member 616 disposed between the second adhesive member 622 and the second waterproof member 612 is adhered to the second housing 220, durability against slip caused by relative movements of the first housing 210 and the second housing 220 may be increased, thereby increasing the durability of the electronic device 200.

Figure 9A:
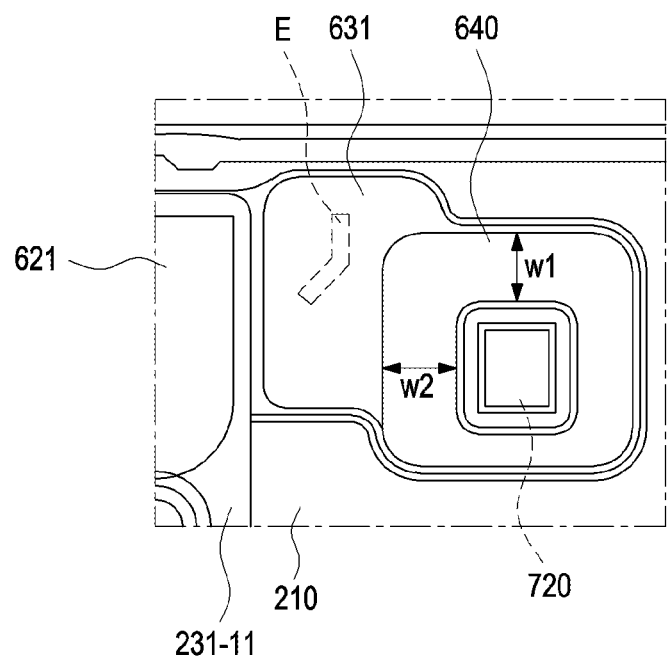
FIG. 9A is a diagram illustrating an area with an electrical component disposed therein, viewed from above according to various embodiments.
Figure 9B:
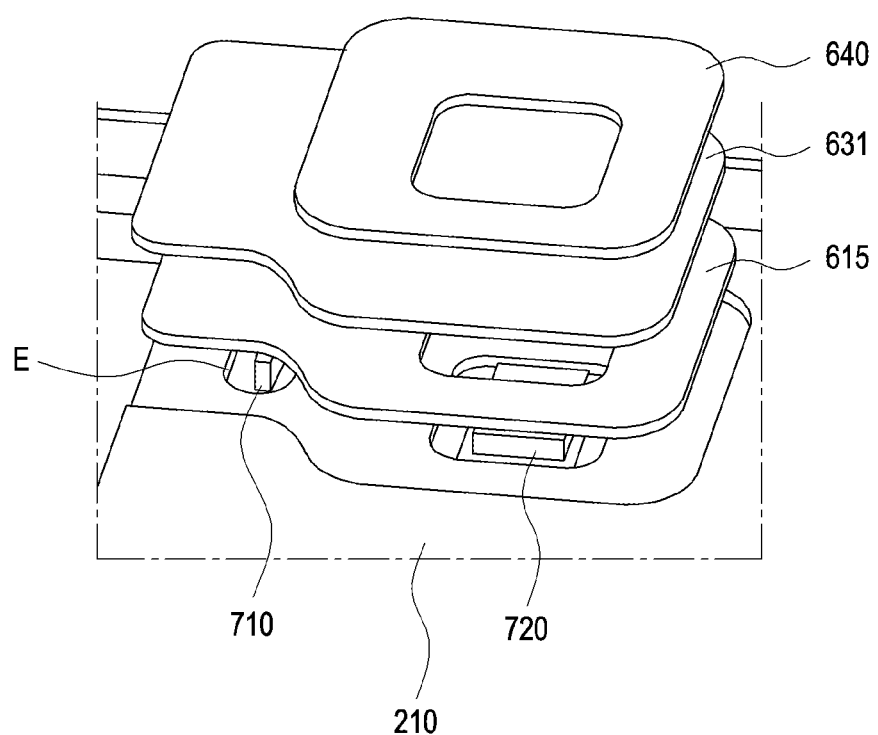
FIG. 9B is an exploded perspective view illustrating the area with the electrical component disposed therein according to various embodiments.

FIG. 9A is a diagram illustrating an area in which an electrical component is disposed, viewed from above according to various embodiments, and FIG. 9B is an exploded perspective view illustrating the area in which the electrical component is disposed according to various embodiments.

FIGS. 9A and 9B will be described with reference to FIGS. 8A and 8B. The first housing 210, the electrical component waterproof member 615, the first adhesive member 621, the first support member 631, the buffer member 640, a microphone (e.g., the microphone 710 of FIG. 8A), and the first hinge module 231-11 illustrated in FIGS. 9A and 9B are identical or similar to the first housing 210, the electrical component waterproof member 615, the first adhesive member 621, the first support member 631, the buffer member 640, the microphone 710, and the first hinge module 231-11 illustrated in FIGS. 2 to 8B. Accordingly, a description of the same or similar components may not be repeated here.

Referring to FIGS. 9A and 9B, according to various embodiments, the first hinge module 231-11 may be coupled to the first housing 210.

According to various embodiments, the first adhesive member 621 may be disposed on the first hinge module 231-11 (in the +Z-axis direction). The first adhesive member 621 may be adhered to the first hinge module 231-11.

According to various embodiments, the electrical component groove 281 may be formed in the first housing 210. According to an embodiment, the electrical component 700 may be disposed in the electrical component groove 281 formed in the first housing 210. The electrical component 700 may include the microphone 710 and the illuminance sensor 720. The electrical component groove 281 may be configured to communicate with a first electrical component hole (e.g., the first electrical component hole 280 of FIG. 4) formed in a second housing (e.g., the second housing 220 of FIG. 4).

According to various embodiments, the first electrical component hole 280 may communicate with the microphone 710 through the microphone conduit (E). At least a part of the microphone conduit E may be formed obliquely and overlap with at least a part of the first electrical component hole 280.

According to various embodiments, the electrical component waterproof member 615 may be disposed on the electrical component 700 and/or the first housing 210 (in the +Z-axis direction). According to an embodiment, the electrical component waterproof member 615 may be adhered to the first housing 210. The electrical component waterproof member 615 may be disposed to cover the electrical component 700. According to an embodiment, the electrical component waterproof member 615 may be disposed to cover the microphone 710 and/or the illuminance sensor 720. As the microphone and the illuminance sensor 720 are covered by the single electrical component waterproof member 615, a first width W1 and a second width W2 of the electrical component waterproof member 615 may be greater than when using two or more electrical component waterproof members 615. As the first width W1 and the second width W2 of the electrical component waterproof member 615 increase, the waterproof performance of the electrical component waterproof member 615 may be improved.

According to various embodiments, the first support member 631 may be disposed on the electrical component waterproof member 615 (in +Z-axis direction). The first support member 631 may be adhered to the electrical component waterproof member 615.

According to various embodiments, the buffer member 640 may be disposed on the first support member 631 (in the +Z-axis direction). According to an embodiment, the first support member 631 may be adhered to the buffer member 640.

As such, as the first support member 631 and/or the buffer member 640 is disposed on the electrical component waterproof member 615 (in the +Z-axis direction), a pressure applied to the electrical component waterproof member 615 may be increased, thereby improving the waterproofing performance. The electrical component waterproof member 615 and/or the buffer member 640 may not be adhered to the flexible display 250. Accordingly, despite relative rotational movements of the first housing 210 and the second housing 220, the electrical component waterproof member 615 and/or the buffer member 640 may be configured not to follow the flexible display 250. According to an embodiment, the vent groove waterproof member 616 may not be adhered to the flexible display 250. Accordingly, despite relative rotational movements of the first housing 210 and the second housing 220, the vent groove waterproof member 616 may be configured not to follow the flexible display 250.

Figure 10:
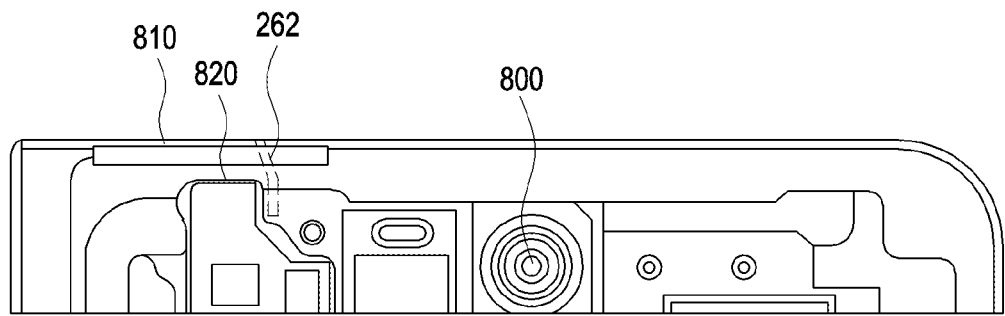
FIG. 10 is a diagram illustrating a partial structure of a second housing in an electronic device, viewed from a rear surface of the second housing according to various embodiments.

FIG. 10 is a diagram illustrating an example structure of a second housing in an electronic device, viewed from the rear surface thereof according to various embodiments.

The second vent hole 262 illustrated in FIG. 10 may be the same as or similar to the second vent hole 262 illustrated in FIGS. 2 to 4 and FIG. 7. Accordingly, a description of the same components may not be repeated here.

Referring to FIG. 10, an antenna 810 may be disposed adjacent to the hinge assembly 230. An antenna contact 820 coupled to the antenna 810 may be disposed at an edge of the second housing 220. The second vent hole 262 may be disposed far from the hinge assembly 230 due to the antenna contact 820 disposed inside the second housing 220. According to an embodiment, the second vent hole 262 may be formed obliquely to a surface forming the second housing 220 or the longitudinal direction of the electronic device 200 to avoid contact with the antenna contact point 820. In addition, as the second vent hole 262 is formed obliquely to the longitudinal direction of the electronic device 200, the second vent hole 262 may be formed at an X-axis position corresponding to a first electrical component hole (e.g., the first electrical component hole 280 of FIG. 4).

An electronic device (e.g., the electronic device of FIG. 1) according to various example embodiments of the disclosure may include: a first housing (e.g., the first housing 210 of FIG. 4), a second housing (e.g., the second housing 220 of FIG. 4), a hinge assembly (e.g., the hinge assembly 230 of FIG. 4) including a hinge disposed between the first housing and the second housing, and including a hinge plate (e.g., the hinge plate 231-2 of FIG. 6A) and a hinge module (e.g., the hinge module 231-1 of FIG. 6A) disposed at both ends of the hinge plate in a longitudinal direction of the hinge plate, a first circuit board (e.g., the first circuit board 271 of FIG. 6A) disposed in the first housing, a second circuit board (e.g., the second circuit board 272 of FIG. 6A) disposed in the second housing, a flexible display (e.g., the flexible display 250 of FIG. 5) disposed on the first housing, the second housing, and the hinge assembly, a first waterproof member (e.g., the first waterproof member 611 of FIG. 6A) comprising a waterproof material disposed between the first housing and the flexible display, a first adhesive member (e.g., the first adhesive member 621 of FIG. 6A) comprising an adhesive disposed between the hinge module and the flexible display, an electrical component (e.g., the electrical component 700 of FIG. 6B) disposed between the first waterproof member and the first adhesive member, an electrical component waterproof member (e.g., the electrical component waterproof member 615 of FIG. 6B) comprising a waterproof material disposed between the electrical component and the flexible display, and a first support (e.g., the first support member 631 of FIG. 7) disposed between the electrical component waterproof member and the flexible display. An electrical component groove (e.g., the electrical component groove 281 of FIG. 7) may be formed in the first housing, the electrical component may be disposed in an area of the first circuit board corresponding to the electrical component groove, and covered by the electrical component waterproof member, and a first electrical component hole (e.g., the first electrical component hole 280 of FIG. 4) coupled to the electrical component groove may be formed in a part of the first housing.

According to various example embodiments, the electrical component groove may be formed obliquely to a longitudinal direction of the hinge assembly.

According to various example embodiments, an opening may be formed in an area of the electrical component waterproof member corresponding to a position of the electrical component.

According to various example embodiments, the first support may comprise polycarbonate.

According to various example embodiments, the electronic device may further include a buffer piece (e.g., the buffer member 640 of FIG. 7) disposed between the first support member and the flexible display.

According to various example embodiments, a first vent hole (e.g., the first vent hole 261 of FIG. 4) may be formed in the first housing, and second electrical component holes (e.g., the second electrical component holes 290 of FIG. 4) may be formed in the second housing.

According to various example embodiments, based on the second housing being folded against the first housing, a position of at least one of the second electrical component holes may correspond to a position of the first vent hole.

According to various example embodiments, a second vent hole (e.g., the second vent hole 262 of FIG. 4) may be formed in the second housing.

According to various example embodiments, based on the second housing being folded against the first housing, a position of the first electrical component hole may correspond to a position of the second vent hole.

According to various example embodiments, the electrical component may include at least one of a microphone (e.g., the microphone 710 of FIG. 7) or an illuminance sensor (e.g., the illuminance sensor 720 of FIG. 7).

According to various example embodiments, the first adhesive member may be adhered to the flexible display and the hinge module.

According to various example embodiments, the first waterproof member may be adhered to the first housing and the flexible display.

According to various example embodiments, the electrical component waterproof member may be adhered to the first housing.

An electronic device (e.g., the electronic device 200 of FIG. 1) according to various example embodiments of the disclosure may include a first housing (e.g., the first housing 310 of FIG. 4), a second housing (e.g., the second housing 220 of FIG. 4), a hinge assembly (e.g., the hinge assembly 230 of FIG. 4) including a hinge disposed between the first housing and the second housing, and including a hinge plate (e.g., the hinge plate 231-2 of FIG. 6A) and a hinge module (e.g., the hinge module 231-1 of FIG. 6A) disposed at both ends of the hinge plate in a longitudinal direction of the hinge plate, a first circuit board (e.g., the first circuit board 271 of FIG. 6A) disposed in the first housing, a second circuit board (e.g., the second circuit board 272 of FIG. 6A) disposed in the second housing, a flexible display (e.g., the flexible display 250 of FIG. 5) disposed on the first housing, the second housing, and the hinge assembly, a first waterproof member (e.g., the first waterproof member 611 of FIG. 6A) comprising a waterproof material disposed between the first housing and the flexible display, a second waterproof member (e.g., the second waterproof member 612 of FIG. 6A) comprising a waterproof material disposed between the second housing and the flexible display, a first adhesive member (e.g., the first adhesive member 621 of FIG. 6A) comprising an adhesive and a second adhesive member (e.g., the second adhesive member 622 of FIG. 6A) comprising an adhesive disposed between the hinge module and the flexible display, an electrical component (e.g., the electrical component 700 of FIG. 6B) disposed between the first waterproof member and the first adhesive member, an electrical component waterproof member (e.g., the electrical component waterproof member 615 of FIG. 6B) comprising a waterproof material disposed between the electrical component and the flexible display, a first support (e.g., the first support member 631 of FIG. 7) disposed between the electrical component waterproof member and the flexible display, a vent groove (e.g., the vent groove 623 of FIG. 6B) disposed between the second waterproof member and the second adhesive member, a vent groove waterproof member (e.g., the vent groove waterproof member 616 of FIG. 7) comprising a waterproof material disposed between the vent groove and the flexible display, and a second support (e.g., the second support member 632 of FIG. 7) disposed between the vent groove waterproof member and the flexible display. An electrical component groove (e.g., the electrical component groove 281 of FIG. 7) may be formed in the first housing, the electrical component may be disposed in an area of the first circuit board corresponding to the electrical component groove, and covered by the electrical component waterproof member, a first electrical component hole (e.g., the first electrical component hole 280 of FIG. 4) communicating with the electrical component groove may be formed in a part of the first housing, and a vent hole (e.g., the vent hole 340 of FIG. 4) communicating with the vent groove may be formed in a part of the second housing.

According to various example embodiments, the electrical component groove and the vent groove may be formed obliquely to a longitudinal direction of the hinge assembly.

According to various example embodiments, an opening may be formed in an area of the first waterproof member corresponding to the vent groove, and an opening may be formed in an area of the second waterproof member corresponding to the electrical component.

According to various example embodiments, the vent hole may include a first vent hole (e.g., the first vent hole 261 of FIG. 4) and a second vent hole (e.g., the second vent hole 262 of FIG. 4), the first vent hole may be formed in the first housing, the second vent hole may be formed in the second housing, and the electronic device may further include second electrical component holes (e.g., the second electrical component holes 290 of FIG. 4) formed in the second housing.

According to various example embodiments, based on the second housing being folded against the first housing, a position of the first electrical component hole may correspond to a position of the second vent hole, and a position of at least one of the second electrical component holes may correspond to a position of the first vent hole.

According to various example embodiments, the electrical component may include at least one of a microphone (e.g., the microphone 710 of FIG. 7) or an illuminance sensor (e.g., the illuminance sensor 720 of FIG. 7).

According to various example embodiments, the first adhesive member and the second adhesive member may be adhered to the flexible display and the hinge plate, the first waterproof member may be adhered to the first housing and the flexible display, the second waterproof member may be adhered to the second housing and the flexible display, the electrical component waterproof member may be adhered to the first housing, and the vent groove waterproof member may be adhered to the second housing.

While specific embodiments have been described in the detailed description of the disclosure, it will be apparent to those skilled in the art that various modifications can be made without departing from the scope of the disclosure.

What is claimed is:

1. An electronic device comprising:
a first housing;
a second housing;
a hinge assembly comprising a hinge disposed between the first housing and the second housing, and including a hinge plate and a hinge module disposed at both ends of the hinge plate in a longitudinal direction of the hinge plate;
a first circuit board disposed in the first housing;
a second circuit board disposed in the second housing;
a flexible display disposed on the first housing, the second housing, and the hinge assembly;
a first waterproof member comprising a waterproof material disposed between the first housing and the flexible display;
a first adhesive member comprising an adhesive disposed between the hinge module and the flexible display;
an electrical component disposed between the first waterproof member and the first adhesive member;
an electrical component waterproof member comprising a waterproof material disposed between the electrical component and the flexible display; and
a first support disposed between the electrical component waterproof member and the flexible display,
wherein an electrical component groove is formed in the first housing,
wherein the electrical component is disposed in an area of the first circuit board corresponding to the electrical component groove, and covered by the electrical component waterproof member, and
wherein a first electrical component hole coupled to the electrical component groove is formed in a part of the first housing.

2. The electronic device of claim 1, wherein the electrical component groove is formed obliquely to a longitudinal direction of the hinge assembly.

3. The electronic device of claim 1, wherein an opening is formed in an area of the electrical component waterproof member corresponding to a position of the electrical component.

4. The electronic device of claim 1, wherein the first support comprises polycarbonate.

5. The electronic device of claim 1, further comprising a buffer piece disposed between the first support and the flexible display.

6. The electronic device of claim 1, wherein a first vent hole is formed in the first housing, and second electrical component holes are formed in the second housing.

7. The electronic device according to claim 6, wherein based on the second housing being folded against the first housing, a position of at least one of the second electrical component holes corresponds to a position of the first vent hole.

8. The electronic device of claim 1, wherein a second vent hole is formed in the second housing.

9. The electronic device of claim 8, wherein based on the second housing being folded against the first housing, a position of the first electrical component hole corresponds to a position of the second vent hole.

10. The electronic device of claim 1, wherein the electrical component includes at least one of a microphone or an illuminance sensor.

11. The electronic device of claim 1, wherein the first adhesive member is adhered to the flexible display and the hinge module.

12. The electronic device of claim 1, wherein the first waterproof member is adhered to the first housing and the flexible display.

13. The electronic device of claim 1, wherein the electrical component waterproof member is adhered to the first housing.

14. An electronic device comprising:
a first housing;
a second housing;
a hinge assembly comprising a hinge disposed between the first housing and the second housing, and including a hinge plate and a hinge module disposed at both ends of the hinge plate in a longitudinal direction of the hinge plate;
a first circuit board disposed in the first housing;
a second circuit board disposed in the second housing;
a flexible display disposed on the first housing, the second housing, and the hinge assembly;
a first waterproof member comprising a waterproof material disposed between the first housing and the flexible display;
a second waterproof member comprising a waterproof material disposed between the second housing and the flexible display;
a first adhesive member comprising an adhesive and a second adhesive member comprising an adhesive disposed between the hinge module and the flexible display;
an electrical component disposed between the first waterproof member and the first adhesive member;
an electrical component waterproof member comprising a waterproof material disposed between the electrical component and the flexible display;
a first support disposed between the electrical component waterproof member and the flexible display;
a vent groove disposed between the second waterproof member and the second adhesive member;

a vent groove waterproof member comprising a waterproof material disposed between the vent groove and the flexible display; and a second support disposed between the vent groove waterproof member and the flexible display, wherein an electrical component groove is formed in the first housing, wherein the electrical component is disposed in an area of the first circuit board corresponding to the electrical component groove, and covered by the electrical component waterproof member, wherein a first electrical component hole configured to communicate with the electrical component groove is formed in a part of the first housing, and wherein a vent hole configured to communicate with the vent groove is formed in a part of the second housing.

15. The electronic device of claim 14, wherein the electrical component groove and the vent groove are formed obliquely to a longitudinal direction of the hinge assembly.

16. The electronic device of claim 14, wherein an opening is formed in an area of the first waterproof member corresponding to the vent groove, and wherein an opening is formed in an area of the second waterproof member corresponding to the electrical component.

17. The electronic device of claim 14, wherein the vent hole includes a first vent hole and a second vent hole, wherein the first vent hole is formed in the first housing, wherein the second vent hole is formed in the second housing, and wherein the electronic device further comprises second electrical component holes formed in the second housing.

18. The electronic device of claim 17, wherein based on the second housing being folded against the first housing, a position of the first electrical component hole corresponds to a position of the second vent hole, and a position of at least one of the second electrical component holes corresponds to a position of the first vent hole.

19. The electronic device of claim 14, wherein the electrical component includes at least one of a microphone or an illuminance sensor.

20. The electronic device of claim 14, wherein the first adhesive member and the second adhesive member are adhered to the flexible display and the hinge plate, wherein the first waterproof member is adhered to the first housing and the flexible display, wherein the second waterproof member is adhered to the second housing and the flexible display, wherein the electrical component waterproof member is adhered to the first housing, and wherein the vent groove waterproof member is adhered to the second housing.

* * * * *